US006931288B1

(12) United States Patent
Lee et al.

(10) Patent No.: US 6,931,288 B1
(45) Date of Patent: Aug. 16, 2005

(54) USER INTERFACE AND SYSTEM FOR CREATING FUNCTION BLOCK DIAGRAMS

(75) Inventors: Jason M. Lee, Cuyahoga Falls, OH (US); Douglas J. Reichard, Fairview Park, OH (US); Unni M. Heineking, Chardon, OH (US); Bruce A. Christensen, Mentor, OH (US); Holly E. Johnson, Elyria, OH (US); Keith M. Hogan, Painesville, OH (US); Kim L. Skippers, Solon, OH (US); Diane N. Ritchie, Mentor on the Lake, OH (US); Steven A. Zuponcic, Solon, OH (US); James H. Jarrett, Bay Village, OH (US); Christopher E. Stanek, Willoughby, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 732 days.

(21) Appl. No.: 09/835,746

(22) Filed: Apr. 16, 2001

(51) Int. Cl.[7] ............................................. G05B 19/42
(52) U.S. Cl. ........................... 700/86; 700/83; 700/17; 715/781; 715/782; 715/762; 715/763; 715/788; 715/835; 715/836; 717/109
(58) Field of Search .......................... 700/83, 86, 17; 345/781, 782, 762, 763, 788; 717/109; 715/835, 715/836, 781–782, 762–763

(56) References Cited

U.S. PATENT DOCUMENTS 5,168,441 A    12/1992   Onarheim et al.
5,301,336 A *   4/1994   Kodosky et al. ............. 715/846
5,377,315 A    12/1994   Leggett
5,530,643 A *   6/1996   Hodorowski .................. 700/86
5,812,394 A *   9/1998   Lewis et al. .................. 700/17
5,838,563 A    11/1998   Dove et al.
5,909,368 A     6/1999   Nixon et al.
5,940,294 A     8/1999   Dove
5,971,581 A *  10/1999   Gretta et al. .................. 700/83
6,078,320 A     6/2000   Dove et al.
6,102,965 A *   8/2000   Dye et al. ..................... 717/109
6,173,208 B1    1/2001   Park et al.
6,370,569 B1 *  4/2002   Austin ......................... 709/217
6,571,133 B1 *  5/2003   Mandl et al. .................. 700/18

OTHER PUBLICATIONS

N C Shu, "Visual programming: Perspectives and approaches", 1999, IBM Systems Journal. vol. 38 issue 2/3; p. 199 (23 pages).*

* cited by examiner

*Primary Examiner*—Anthony Knight
*Assistant Examiner*—Thomas Pham
(74) *Attorney, Agent, or Firm*—Amin & Turocy LLP; William R. Walbrun

(57) ABSTRACT

A controller configuration system and user interface therefor are disclosed for creating and editing controller function block diagrams for use in control systems. The interface provides feedback loop identification features, wire connection cross-referencing and hyperlinks, wire connector name matching, pin datatype visualization, correct wiring indication and wiring error indications, and intelligent deletion and restoration features. In addition, the interface provides block morphing, free-form text boxes, error navigation, error indication, and block execution status information.

34 Claims, 18 Drawing Sheets

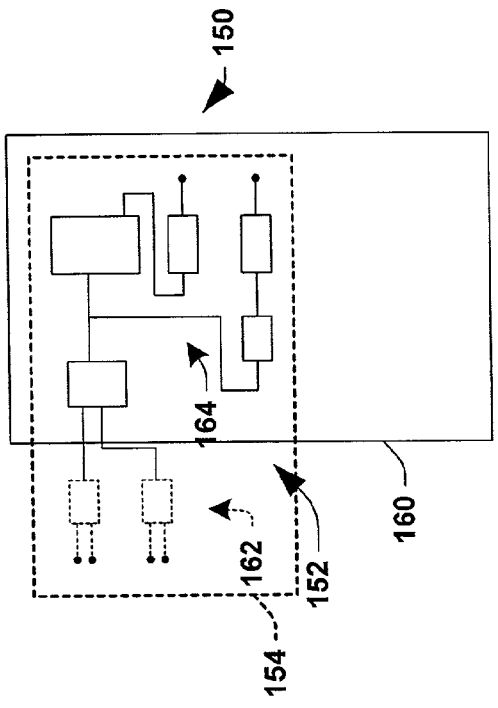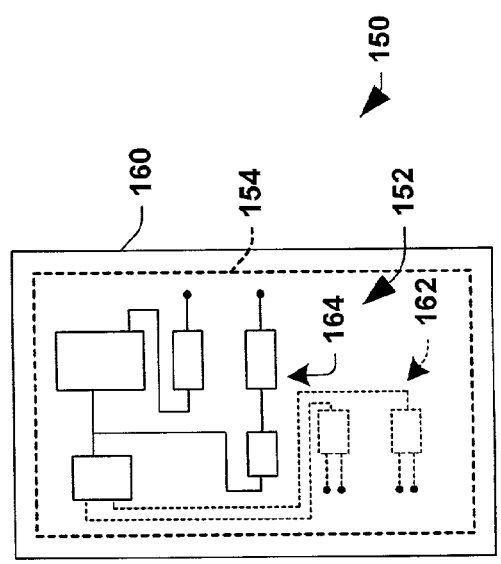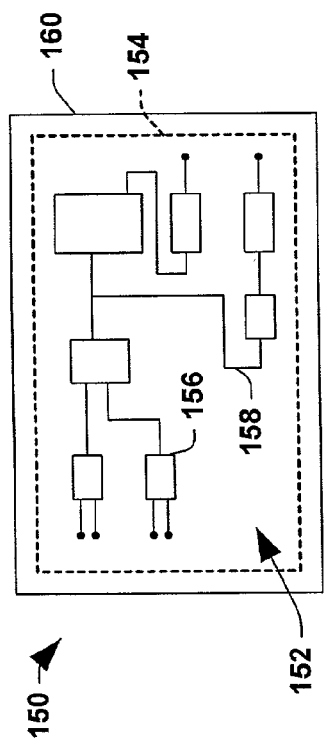
FIG. 3
FIG. 4
FIG. 5

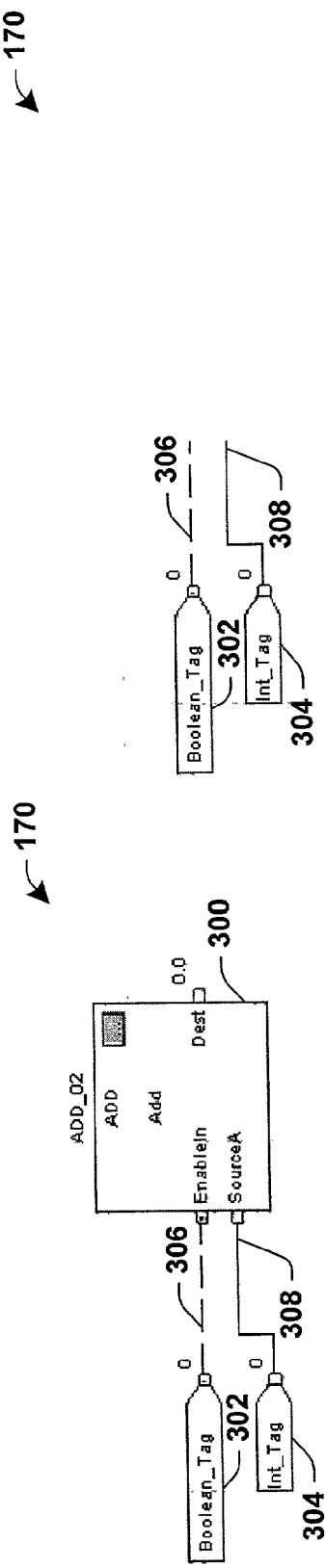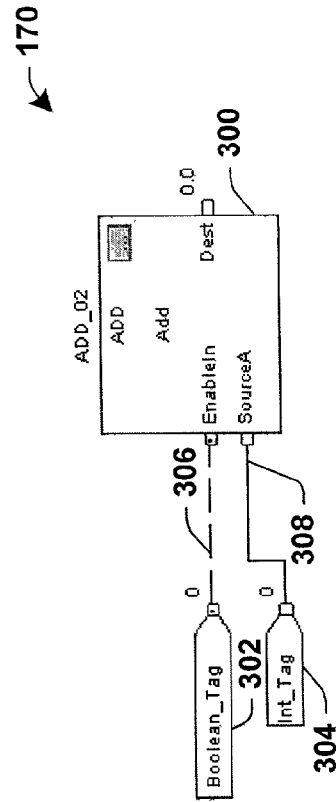
FIG. 14
FIG. 15
FIG. 16
FIG. 17

USER INTERFACE AND SYSTEM FOR CREATING FUNCTION BLOCK DIAGRAMS

TECHNICAL FIELD

The present invention relates to the art of industrial control systems, and more particularly to a user interface and method for creating function block diagrams for industrial control systems.

BACKGROUND OF THE INVENTION

Industrial controllers are special purpose processing devices used for controlling industrial processes, machines, manufacturing equipment, and other factory automation applications. In accordance with a control program or routine, an industrial controller may measure one or more process variables or inputs representative of the status of a controlled process, and change outputs effecting control of the process. The inputs and outputs may be binary, (e.g., on or off), and/or analog assuming a continuous range of values. The control routine may be executed in a series of execution cycles with batch processing capabilities, and may comprise one or more functional units. Such a control routine may be created in a controller configuration system having tools and interfaces whereby a user may implement a control strategy using programming languages or graphical representations of control functionality, sometimes referred to as function blocks. The control routine may be downloaded from the configuration system into one or more controllers for implementation of the control strategy in controlling a process or machine.

An industrial controller may be customized to a particular process by writing one or more control software routines that may be stored in the controller memory and/or by changing the hardware configuration of the controller to match the control task or strategy. Such control routines may be generated using controller configurations systems or tools, which facilitate translation of a desired control strategy for the process into a control routine executable in a controller. Control routines may be programmed by a user in a source programming language, or in a graphical fashion using visual representations of control functions, sometimes referred to as function blocks. Ladder logic programming is also employed where the inputs and outputs of the system are largely or entirely boolean in nature. Function blocks and ladder logic programming provide programming capabilities to a user unskilled in generating program code, and function block programming is particularly adapted to use in process control applications, where analog functionality is needed to implement a particular control strategy.

A user models a control strategy by placing function blocks in a user interface work surface, and associating the function blocks using graphical connections known as wires, via a graphical user interface. For example, the user may drag and drop graphical representations of the function blocks onto a work surface or work space in a graphical user interface. The associations between various function blocks may then be established by connecting outputs and inputs of the function blocks using wires or other connectors in the interface. Once the user has thus defined the desired control strategy, the configuration system compiles or verifies the graphical representation to produce a control routine, which may then be downloaded to one or more control modules in the control system. The control functions represented by the function blocks are implemented in the verified control routine according to execution ordering which may be determined in the compilation or verification process in the configuration tool.

Although conventional controller configuration tools and systems provide some measure of functionality enabling user to create function block diagrams for use in control systems, various shortcomings exist in such present tools. For instance, many existing configuration tools do not provide for ensuring proper data flow in function block diagrams, instead relying on the user to perform manual function block execution ordering. Such systems do not allow the user to provide for feedback loop identification. In addition, conventional configuration tools provide limited intelligence in interfacing with a user, wherein the user is not made aware of logical or semantic problems in a function block diagram until a compiler or verification error is provided. Accordingly, there is a need for improved controller configuration tools and interfaces therefor, for use in creating function block diagrams.

SUMMARY OF THE INVENTION

The following presents a simplified summary of the invention in order to provide a basic understanding of some aspects of the invention. This summary is not an extensive overview of the invention. It is intended neither to identify key or critical elements of the invention nor to delineate the scope of the invention. Its sole purpose is to present some concepts of the invention in a simplified form as a prelude to the more detailed description that is presented later. The invention provides systems and interfaces by which the above mentioned and other problems are reduced or minimized in the creation and editing of function block diagrams and other control strategy representations. In accordance with an aspect of the present invention, there is provided a controller configuration system and a user interface therefor by which function block diagrams may be edited and/or created. The interface comprises a function block diagram representation wherein the interface allows a user to modify the function block diagram representation in the controller configuration system. In addition, the user interface further comprises one or more indicia to aid a user in editing or creating such function block diagrams.

For example, the interface may comprise a feedback loop indicia, such as a localized feedback wire indicating the presence of a feedback loop in the function block diagram representation. The interface may alternatively or in combination provide a wire connector cross-reference indicia. The wire connector cross-reference indicia may provide an indication of a connection associated with a wire connector. For instance, input and output wire connectors may provide for association between inputs and outputs of function blocks located remotely from one another in the function block diagram. The cross-reference indicia may provide the user with an indication of all locations in the function block diagram with which a particular wire connector is associated. The cross-reference indicia may further provide a hyperlink to the connection associated with the wire connector in the function block diagram representation.

The interface may also comprise a pin datatype indicia, which may provide an indication of whether a datatype associated with a function block pin is one of boolean, non-boolean, or unknown in the function block diagram representation. This indicia facilitates the user making proper connections between value sources (e.g., function block outputs) and data inputs. The interface may further provide wiring error indicia and a correct wiring indicia. For instance, the wiring error indicia may provide an indication that a user is attempting to make an improper wiring connection to a function block in the function block diagram representation (e.g., wiring a boolean output pin to a floating point input pin). The correct wiring indicia may provide an indication that a user is attempting to make a proper wiring connection to a function block in the function block diagram representation. This may be useful, for example, where a user is making connections to a function block pin with the interface (e.g., display) image "zoomed" out. In this case, the wiring error indicia or the correct wiring indicia may assist the user in connecting wires to appropriate pins in a function block diagram.

According to another aspect of the invention, the interface may comprise a free-form text box, in which a user may embed text, links, graphics, or other information into a function block diagram. For example, the free-form text box may comprise text, OLE objects, controls, faceplates, HTML tagged text, and/or links in the function block diagram representation. To further assist the user in creating error-free function block diagrams, the user interface may comprise a configuration error indicia, to indicate a possible error in the function block diagram. This may be employed, for example, where the user interface checks for proper function block configuration as the user is creating or editing a function block diagram. The configuration error indicia may comprise an indication proximate a function block diagram element in the function block diagram representation indicating that the function block diagram element cannot be verified as currently configured.

The interface may further comprise a block execution status information indicia, to indicate the status of a function block in the user interface. The block execution status information indicia, in this regard, may comprise an indication in a properties page associated with the function block. The interface may alternatively or in combination comprise a wired block parameter indicia. This indicia provides an indication in a properties page associated with a function block that a parameter associated with the block is wired to a value source in the function block diagram representation. This may advantageously indicate to the user that since the parameter is wired to a value source in the function block diagram, a value for the parameter may not be set manually in the user interface.

According to another aspect of the invention, a user interface is provided for creation and editing of a function block diagram in a controller configuration system, which comprises an image boundary in which a user may locate function block diagram elements in creating and editing the function block diagram, and a sheet boundary, wherein function block diagram elements within the sheet boundary are rendered as a unitary output item when the controller configuration system generates an output representation of the function block diagram. According to this aspect of the invention, the user interface maintains the image boundary within the sheet boundary. The user may desire to create a printout or other output representation of a function block diagram, which may be used for documentation purposes, troubleshooting or control system analysis, or for auditing purposes. In this regard, it is desirable to have output representations accurately and completely reflect the function block diagram representation of a control routine executing in a control system.

The user may create a function block diagram having one or more sheets with associated image boundaries therein. The invention provides for maintaining the image boundary within the sheet boundary for the sheets in the function block diagram, whereby the output printout is ensured to accurately and completely reflect all elements (e.g., function blocks, wires, input references, and output references, and the like) in the function block diagram. According to an aspect of the invention, the user may place and move function block diagram elements only within the sheet boundary.

In addition, the invention allows the user to reconfigure the sheet layout properties, such as for printing to a particular printer or paper size/configuration (e.g., portrait versus landscape), without losing function block information, and while ensuring that the printout accurately reflects the function block diagram. Thus, the user may move the sheet boundary from a first sheet location covering a first sheet area to a second sheet location covering a second sheet area in the user interface. The user interface may automatically move the image boundary from a first image location within the first sheet location to a second image location within the second sheet location.

In addition, where a first set of function block diagram elements are located within the first sheet area and outside the second sheet area, the user interface may automatically relocate the first set of function block diagram elements to be within the second sheet area. The user interface may maintain associations between the function block diagram elements in the function block diagram in relocating the first set of function block diagram elements. This ensures that a printout employing the new sheet layout will include all the function block elements. In addition, the user interface may save the locations of the function block diagram elements before and after the relocation, so as to reconstruct the original locations if the user subsequently resets the sheet layout.

Another aspect of the invention provides input and output wire connectors in the interface having names associated therewith. The user interface is adapted to establish an association between a first function block diagram element connected to an input wire connector and a second function block diagram element connected to an output wire connector if the input wire connector name and the output wire connector name are the same. The input and output wire connectors may thus be employed to associate or connect function blocks located remotely from one another in a function block diagram. A user may create the input wire name associated with the input wire connector, and the user interface may indicate output wire names associated with output wire connectors available for association with the input wire connector being named. In this manner, the user need not remember the particular (e.g., possibly remote) wire connector names available in the function block diagram, which is particularly advantageous where a large number of such connectors exist.

The user may select an output wire name, for example, from a drop down list in the interface, for use as the input wire name in order to associate the input wire connector with a desired output wire connector. In similar fashion, the user may create an output wire name associated with the output wire connector, wherein the user interface may indicate to the user input wire names associated with input wire connectors available for association with the output wire connector. A drop down list of such available names may be provided, from which the user may select an input wire name in order to associate the output wire connector with a desired input wire connector. In order to prevent unintended association of an input with more than one output value sources, input wire names associated with input wire connectors already associated with another output wire connector are not indicated to the user.

According to yet another aspect of the invention, the user interface may comprise a block tag name indicia associated with a function block in the function block diagram, and a block tag name associated with the related system tag. The interface may indicate the block tag name proximate the function block in the function block diagram. The name may be used to associate instance data with an instance of a function block. The interface may create a system tag and a block tag name for each function block as the user adds function blocks to the function block diagram, wherein the block tag name created by the user interface for each function block is unique within the function block diagram. The user may also manually rename a block tag for a function block in the function block diagram, such as where a functional name is desired. In this case, the user interface may determine whether the block tag name chosen by the user is unique within the function block diagram, and if not, may provide an overlap error to the user.

The interface may also provide intelligent deletion and restoration features, allowing a user to selectively delete and restore function block diagram elements in the function block diagram. For example, the user may delete a function block in the function block diagram, and the interface may automatically delete one or more wires associated with a deleted function block in the function block diagram. Thereafter, the user may decide to restore the deleted function block, in which case; the interface automatically restore the one or more deleted wires associated with the restored function block in the function block diagram.

Another aspect of the invention provides function block information copying features in the user interface. Where a user has a first function block having configuration information (e.g., block tag, pin visibility information, default parameter values, or the like) associated therewith, the user may copy the first function block to create a new function block in the function block diagram. The user interface is adapted to automatically copy the configuration information associated with the first function block, and to associate the copied configuration information with the new function block. The user thus need not reconfigure each copy of a function block, in order to achieve similar configurations thereof.

Another aspect of the invention provides function block type morphing features in the user interface. For instance, a function block may have a function block type associated therewith (e.g., add, subtract, AND, OR, etc.) in the function block diagram, and the user interface may allow the user to change the function block type associated with the function block. The interface may also preserve wires connected to the function block when the user changes the function block type associated with the function block. In this fashion, the user may decide there is a logic error in the function block diagram (e.g., an AND function where an OR function is desired), and simply change the block type, without having to delete the AND block, and substitute an OR block.

The user interface may also provide an error message indicia, which indicates to a user that an error condition related to the function block diagram exists. The user may select the error message indicia, and the interface may automatically render a function block diagram element associated with the selected error condition to the user. For instance, the interface may include a function block diagram portion and an error message portion indicating textual or other forms of error indicia. When the user selects (e.g., double clicks) on a particular error message, the function block diagram portion of the interface may navigate to a function block associated with the selected error condition when the user selects the error message.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

BRIEF DESCRIPTION OF THE DRAWINGS

FIGS. 3–5 are schematic illustrations of an exemplary sheet model according to another aspect of the invention;

FIGS. 14–17 are schematic illustrations of intelligent delete and restore aspects of the invention;

DETAILED DESCRIPTION OF THE INVENTION

Figure 1:
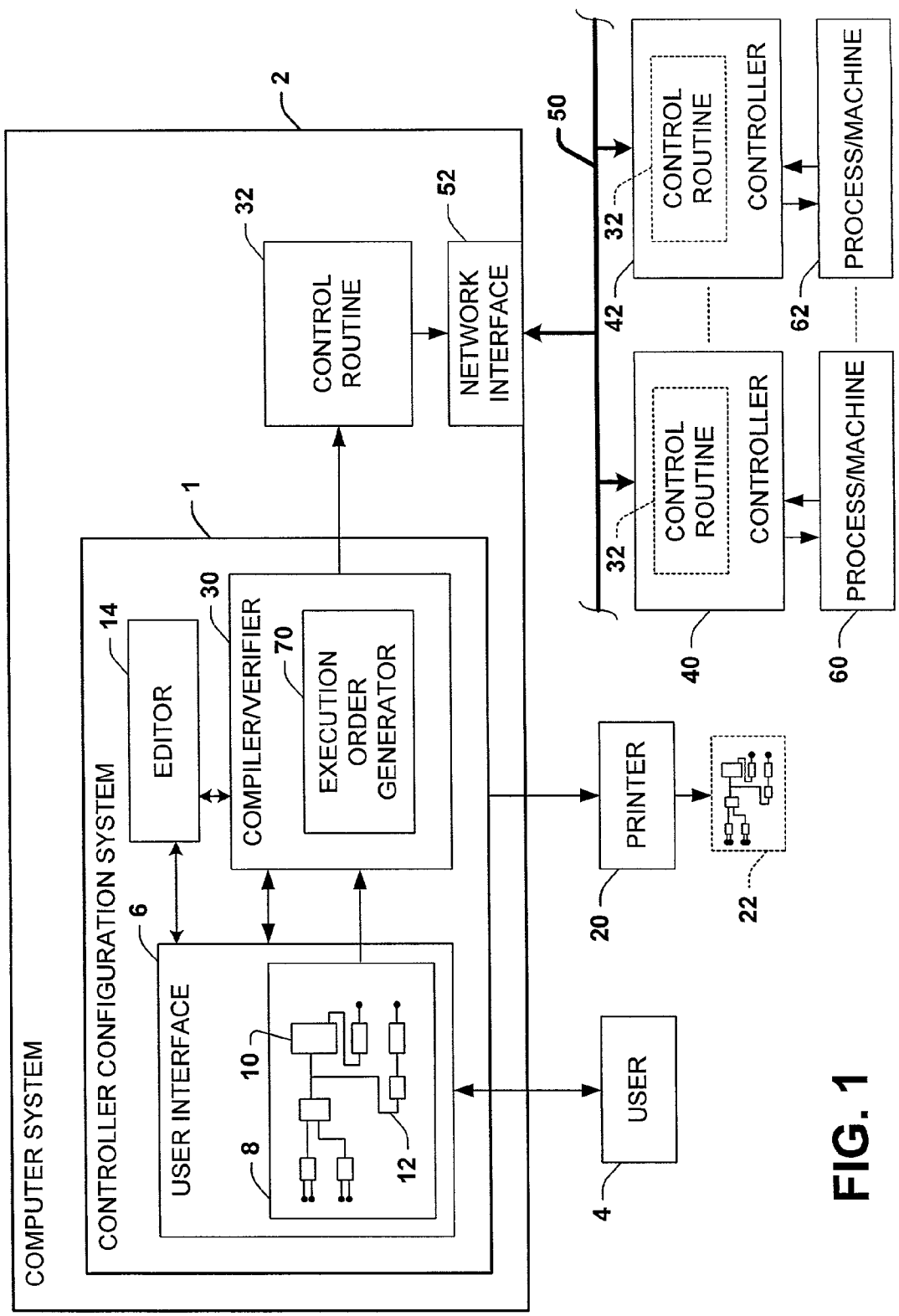
FIG. 1 is a schematic diagram illustrating an exemplary controller configuration system and user interface therefor in accordance with an aspect of the present invention.

The various aspects of the present invention will now be described with reference to the drawings, wherein like reference numerals are used to refer to like elements throughout. The invention provides a controller configuration system and a user interface therefor, which allow a user to easily create and edit function block diagrams for use in association with a control system. In order to provide context for the various features and aspects of the invention, a brief description of an exemplary controller configuration system and user interface are hereinafter provided. It will be appreciated that one or more aspects of the invention may be carried out in association with the controller configuration systems and interfaces illustrated herein, as well as with other systems and interfaces not illustrated.

Referring now to FIG. 1, an exemplary controller configuration tool or system 1 is illustrated, which may be implemented in software, hardware, and/or combinations thereof, in a computer system 2. A user 4 interacts with the system 1 via a user interface 6, which may be graphical in nature, in order to generate or modify a function block diagram 8 (e.g., or a graphical representation thereof), which may comprise a plurality of function blocks 10 and associations 12 (e.g., wires), as well as other function block diagram elements (e.g., input references, output references, and the like). The interface 6 is operationally associated with an editor 14, whereby the user may locate and interconnect the desired function blocks 10 and other function block diagram elements in order to create a graphical representation (e.g., a function block diagram representation) of a desired control strategy to be implemented in a control system. The computer system 2 may include output devices such as a printer 20 adapted to provide a printout 22 or other output representation of the function block diagram 8 for documentation, troubleshooting, auditing, or other purposes.

The controller configuration system 1 may also include a compiler or verifier component 30 for generating a compiled or verified control routine or program 32 according to the function block diagram 8. The control routine 32 may then be downloaded to one or more controllers 40, 42, via a network 50 and a network interface 52 in the computer system 2. The downloaded control routine 32 may then be executed in the controller or controllers 40, 42 for controlling the operation of controlled processes or machines 60, 62, respectively.

The controller configuration system 1 further comprises an execution order generator 70 according to an aspect of the invention, which is operative to determine input data availability for the blocks in the diagram 8, and to generate an execution order therefor according to the input data availability. The execution order generation may be accomplished using the generator 70, as part of the compiler component 30, or separate therefrom. The execution order generator 70 and the controller configuration system of the invention advantageously provide for automatic function block execution order generation according to data availability, whereby proper data flow may be achieved in accordance with the present invention.

Figure 2:
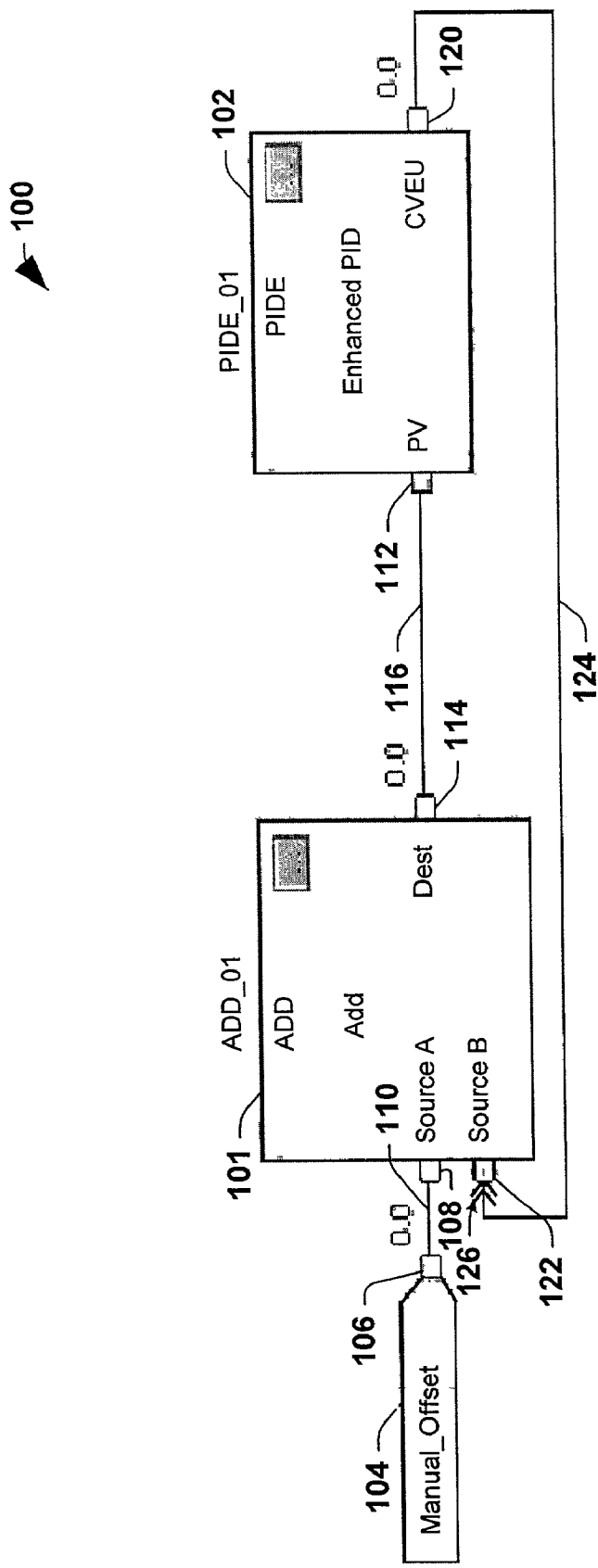
FIG. 2 is a schematic illustration of an exemplary localized feedback wire according to another aspect of the invention.

Referring also to FIG. 2, the interface 6 of FIG. 1 may comprise a feedback loop indicia to facilitate execution order generation via the generator 70. The user 4 may employ the feedback loop indicia in order to indicate a known or intended feedback loop or data path in the function block diagram 8. For instance, the feedback loop indicia may comprise a localized feedback wire 126 (e.g., FIG. 2) indicating the presence of a feedback loop in an exemplary function block diagram 100, having function blocks 101 and 102, with associations (e.g., wires) therebetween providing a desired functional interrelationship between the function blocks 101 and 102, as well as an input reference 104.

Associations between the function blocks 101, 102 and the input reference 104 are established using wires, for example, wherein an output 106 of the input reference 104 is associated with a first input 108 of function block 101 by a wire 110, and an input 112 of function block 102 is associated with an output 114 of function block 101 via a wire 116. An output 120 of the function block 102 is associated with a second input 122 of function block 101 via a localized feedback wire 124, which is graphically denoted by a double arrow feedback loop indicia 126 at the input 122. The function block diagram 100 thus includes a feedback loop comprising output 120, localized feedback wire 124, input 122, output 114, wire 116, and input 112.

The diagram 100 may be ordered for execution (e.g., via the execution order generator 70 of FIG. 1), whereby input data availability is determined for the function blocks 101 and 102 therein, and an execution order is generated according to the input data availability. The execution order generator 70, for example, may determine the existence of the feedback loop according to the feedback loop indicia 126. The indicia 126 thus provides the user with the ability to explicitly denote the existence of feedback loops in a function block diagram, which the execution order generator 70 may then use to automatically establish an execution order for function blocks in the diagram according to data availability. For instance, the order generator 70 may assume data availability for input pins to which a localized feedback wire or other feedback loop indicia (e.g., 126) is connected in determining data availability for the function block diagram.

Referring now to FIGS. 3–5, another aspect of the invention provides for maintaining a function block diagram image boundary coextensive with or within a sheet boundary, whereby output representations (e.g., printouts) of a function block diagram accurately and completely correspond with the function block diagram in the controller configuration system. As illustrated in FIG. 3, an exemplary user interface 150 provides for editing and creating a function block diagram 152 in a controller configuration system (e.g., system 1 of FIG. 1). The exemplary interface 150 comprises an image boundary 154 in which a user may locate function block diagram elements such as function blocks 156 and wires 158 in creating and editing the function block diagram 152. The interface 150 further comprises a sheet boundary 160, wherein function block diagram elements (e.g., blocks 156, wires 158, input and output references, etc.) within the sheet boundary 160 are rendered as a unitary output item when the controller configuration system (e.g., system 1 of FIG. 1) generates an output representation (e.g., printout 22) of the function block diagram 152.

According to an aspect of the invention, the interface 150 is adapted to maintain the image boundary 154 within the sheet boundary 160, even where the user reconfigures the sheet boundary 160. For example, the user may desire to create a printout (e.g. printout 22 via printer 20 of FIG. 1) or other output representation of a function block diagram 152, which may be used for documentation purposes, troubleshooting or control system analysis, or for auditing purposes. Such output representations may be required to accurately and completely reflect the function block diagram representation of a control routine executing in a control system. The invention provides for maintaining the image boundary 154 coextensive with or within the sheet boundary 160 for one or more sheets in the function block diagram 152. Thus, where a printout includes everything within the sheet boundary 160, the printout is ensured to accurately and completely reflect all elements (e.g., function blocks, wires, input references, and output references, and the like) in the function block diagram 152. In accordance with an aspect of the invention, the user may place and move function block diagram elements only within the sheet boundary 160. Accordingly, the interface 150 may enforce sheet rules in determining whether to allow or reject an attempt by the user to place or move such elements within the function block diagram 152.

In addition, the invention allows the user to reconfigure the sheet layout properties in the interface 150, such as for printing to a particular printer or paper size/configuration (e.g., portrait versus landscape), without losing function block information, and while ensuring that the printout accurately reflects the function block diagram 152. Thus, the user may move the sheet boundary 160 from a first sheet location as illustrated in FIG. 3 covering a first sheet area to a second sheet location as illustrated in FIG. 4 covering a second sheet area in the user interface 150. The interface 150 is adapted to automatically move the image boundary 154 from a first image location within the first sheet location to a second image location within the second sheet location as illustrated in FIGS. 4 and 5.

The relocation of the sheet boundary 160 by the user and the automatic relocation of the image boundary 154 may create a situation where a first set 162 of function block diagram elements are located within the first sheet area and outside the second sheet area, while a second set 164 are located within the sheet area before and after the move, as shown in FIG. 4. According to another aspect of the invention, the user interface 150 is adapted to automatically relocate the first set 162 of function block diagram elements to be within the second sheet area, as illustrated in FIG. 5. The user interface 150 may maintain associations between the function block diagram elements in the function block diagram 152 in relocating the first set 162 of function block diagram elements. This ensures that a printout employing the new sheet layout will include all the function block elements. In addition, the user interface 150 may save the locations of the function block diagram elements before and after the relocation, and automatically reconstruct the original locations if the user subsequently resets the sheet layout (e.g., to that illustrated in FIG. 3).

Figure 6:
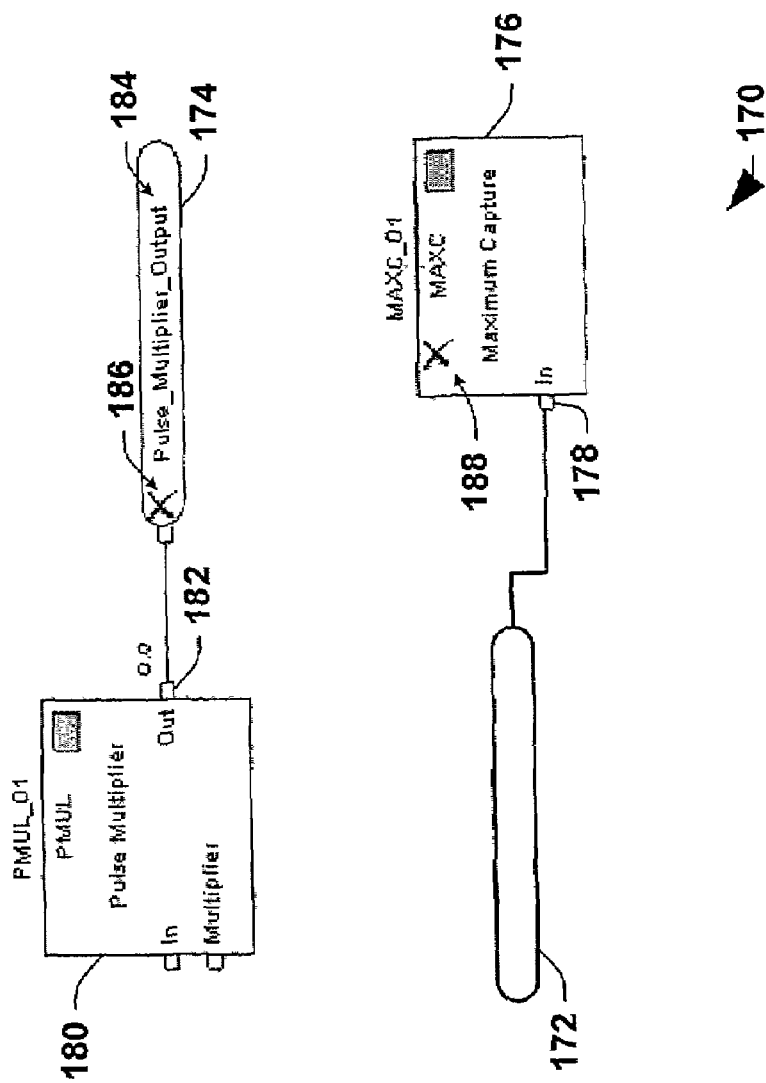
FIGS. 6 and 7 are schematic illustrations of exemplary input and output connectors according to another aspect of the invention.
Figure 7:
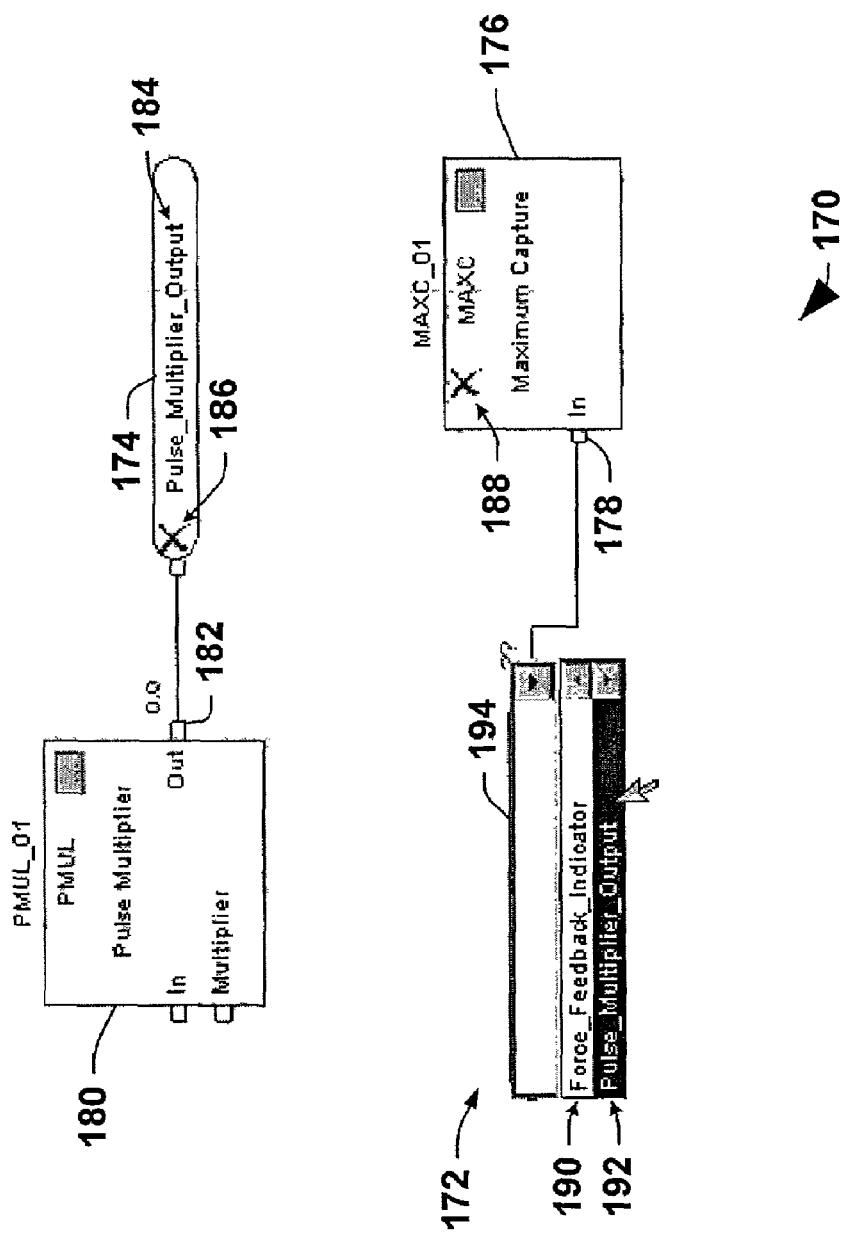

FIGS. 6 and 7 illustrate another aspect of the invention, which provides input and output wire connectors 172 and 174, respectively, in a user interface 170 having names associated therewith. The user interface 170 is adapted to establish an association between a first function block diagram element, such as function block 176 having an input 178 thereto connected to input wire connector 172 (e.g., via a wire), and a second function block diagram element, such as function block 180, having an output 182 therefrom connected to the output wire connector 174 if the input wire name and the output wire name are the same. The input and output wire connectors 172 and 174, respectively, may thus be employed to associate or connect function blocks 176 and 180, respectively, for example, where the function blocks 176 and 180 are located remotely from one another in a function block diagram. For instance, the function blocks 176 and 180 may be located on different sheets or pages of a function block diagram.

In order to establish such an association between the output 182 of block 180 and the input 178 of block 176, the user may connect the output wire connector 174 to the output 182 of block 180 as illustrated in FIG. 6, and assign an output wire name 184 thereto (e.g., Pulse_Multiplier_Output). The interface 170 may initially mark the output wire connector 174 with an error indicia 186, such as a brushed "X" on or proximate the output wire connector 174, indicating that the output wire connector 174 or the function block 180 associated therewith cannot be properly verified or compiled. For instance, until an input wire connector is provided in the function block diagram having the same name 184, the output wire connector 174 will generate a compiler or verification error.

Accordingly, the user may connect an input wire connector 172 to the input 178 of the function block 176. Initially, the interface provides an error indicia 188 to the function block 176 associated with the unnamed input wire connector 172, because the function block 176 cannot be verified without a specified input source for input 178. In order to properly associate the output 182 with the input 178, the user may create an input wire name associated with the input wire connector 172. In accordance with another aspect of the invention, the user interface 170 (FIG. 7) may indicate output wire names 190 and 192 associated with output wire connectors (e.g., output wire connector 174) available for association with the input wire connector 172 being named. For instance, the names "Pulse_Multiplier_Output" (e.g., name 184 of output wire connector 174) and "Force_Feedback_Indicator" may be available from output wire connectors in the function block diagram, for association with the input wire connector 172. This aspect of the invention advantageously shows the user which output wire connectors have been previously set up, and thus the user need not remember the particular (e.g., possibly remote) wire connector names available in the function block diagram. It will be appreciated that this feature is particularly advantageous where a large number of such connectors exist.

The user may select an output wire name 190 or 192, for example, from a drop down list 194 in the interface 170, for use as the input wire name in order to associate the input wire connector 172 with a desired output wire connector (e.g., output wire connector 174). In similar fashion, the user may create an output wire name (e.g., name 184) associated with the output wire connector 174, wherein the user interface 170 may indicate input wire names (not shown) to the user, which names are associated with input wire connectors available for association with the output wire connector 174. A drop down list (not shown) of such available names may be provided, from which the user may select an input wire name in order to associate the output wire connector 174 with a desired input wire connector. In order to prevent unintended association of an input (e.g., input 178 of function block 176) with more than one output value source, input wire names associated with input wire connectors already associated with another output wire connector are not indicated to the user.

Figure 8:
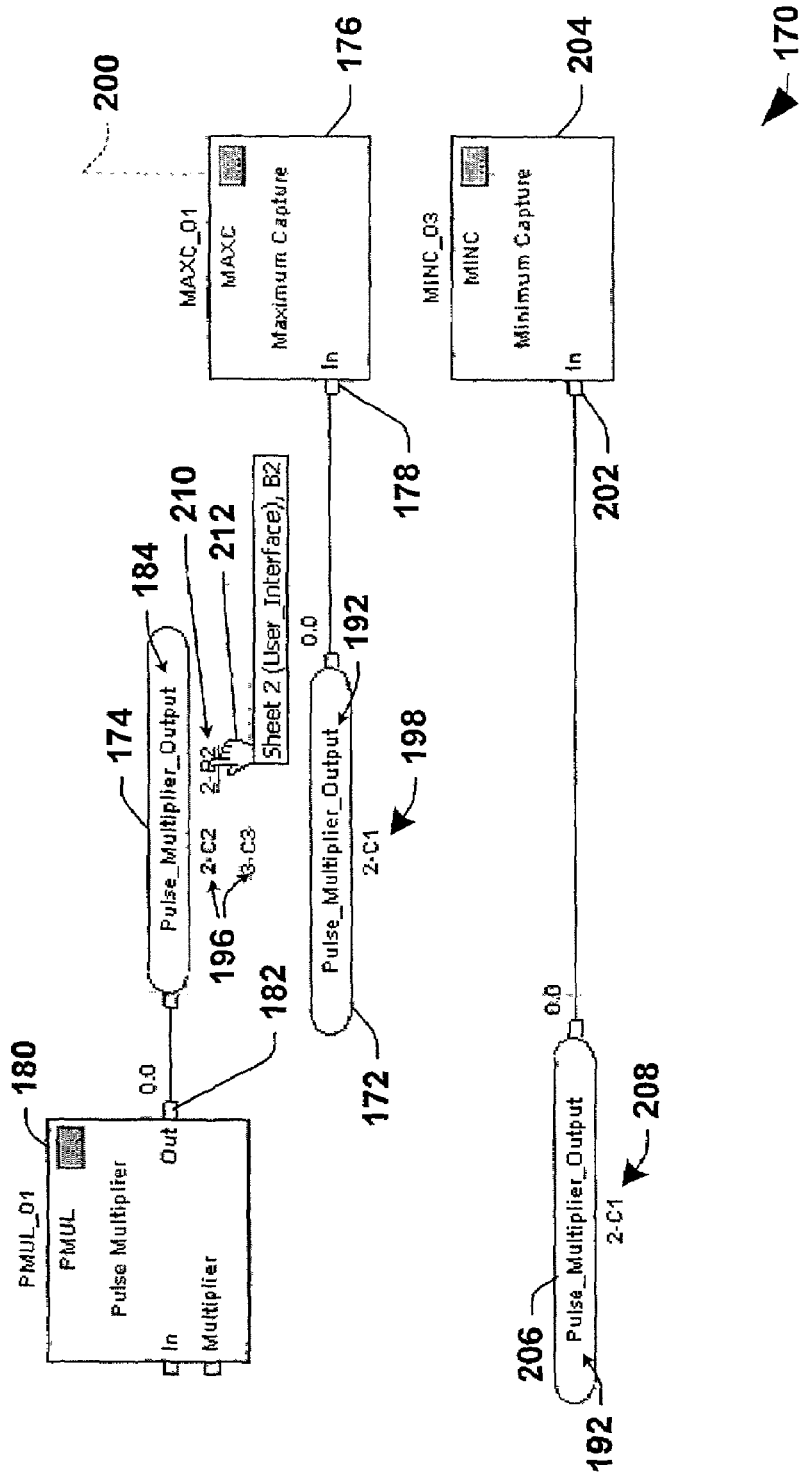
FIG. 8 is a schematic illustration of exemplary wire connector cross-references according to another aspect of the invention.

Referring now to FIG. 8, another aspect of the invention provides the controller configuration user interface 170 with one or more wire connector cross-reference indicia. For instance, where the user has selected the input wire connector name 192 (e.g., Pulse_Multiplier_Output) in the above example for the input wire connector 172, an association is established between the output 182 and the input 178 of function blocks 180 and 176, respectively. With the input wire name 192 and the output wire name 184 matching (e.g., thus establishing an association between input 178 and output 182), the user interface 170 advantageously provides wire connector cross-reference indicia 196 proximate the output wire connector 174 and cross-reference indicia 198 proximate the input wire connector 172.

The wire connector cross-reference indicia 196 and 198 provide an indication of a connection associated with wire connectors 174 and 172, respectively. For instance, the cross-reference indicia 196 indicates to the user that the output wire connector 174 is associated in the function block diagram with input wire connectors (e.g., input wire connector 172) at locations 2-C2, 2-B2, and 3-C3, for example, wherein location 2-C2 corresponds with function block diagram sheet 2, at grid location C2. In this regard, the interface 170 may provide grid lines 200 in order to provide for references to particular sections of a particular function block diagram sheet. Similarly, the cross-reference 198 associated with the input wire connector 172 provides an indication of the output wire connector 174 associated with the input wire connector 172. Furthermore, where the user has associated another input 202 of a third function block 204 with the output 182 of the function block 180 via an input wire connector 206 (e.g., using the name Pulse_Multiplier_Output), the interface 170 provides a wire connector cross-reference indicia 208 indicating the source of the value (e.g., output 182 of function block 180).

The wire connector cross-reference indicia 196, 198, and 208 may thus provide the user with an indication of all locations in the function block diagram with which a particular wire connector is associated. The cross-reference indicia may further provide a hyperlink 210 to the connection associated with the wire connector 174 in the function block diagram representation. The user may thus place a cursor 212 over a particular cross-reference indicia, and the user interface 170 displays the location of the hyper link 210. Where the user thereafter clicks or otherwise selects the cross-reference indicia 196, the interface 170 may navigate the user to the selected cross-referenced location in the function block diagram.

Figure 10:
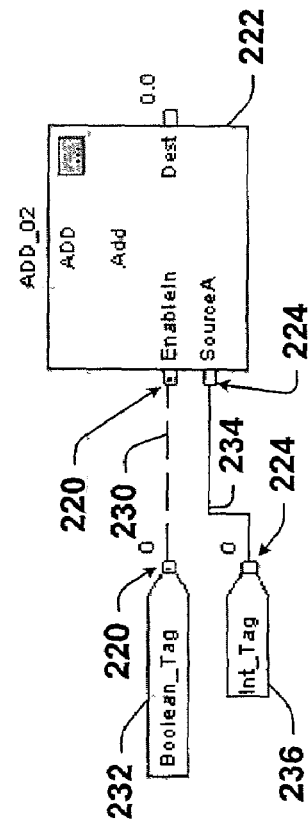
FIGS. 9 and 10 are schematic illustrations of exemplary function block pin and wire data type indications according to another aspect of the invention.
Figure 9:
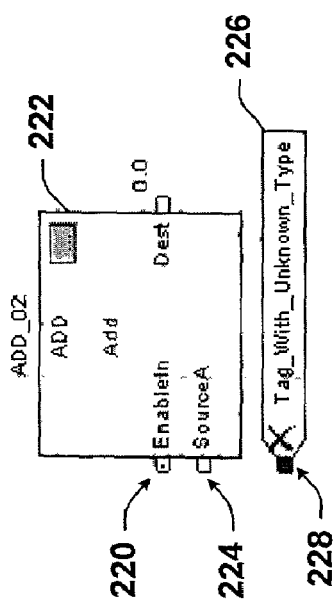

Referring now to FIGS. 9 and 10, the invention further provides for wire and pin datatype indicia. As illustrated in FIG. 9, an exemplary pin datatype indicia 220 may include a dot or other indication that an EnableIn input for function block 222 is of a first type (e.g., boolean), whereas another pin datatype indicia 224 (e.g., blank) provides an indication that a SourceA input to the block 222 is of a second datatype (e.g., non-boolean). Furthermore, where an output reference 226 has not been associated with a particular function block output pin, the datatype for the output reference pin is unknown, for which an unknown datatype indicia 228 may be provided. Referring also to FIG. 10, the user interface may further indicate the datatype of wires in the function block diagram. For example, a dashed wire 230 may indicate a boolean datatype, where a boolean input reference 232 is connected to the EnableIn input of the function block 222 using the wire 230. Similarly, a solid wire 234 may be employed to indicate a non-boolean datatype where a non-boolean input reference 236 is connected to the SourceA input of the function block 222. The pin and wire datatype indicia facilitate the user making proper connections between value sources (e.g., function block outputs) and data inputs.

Figure 11:
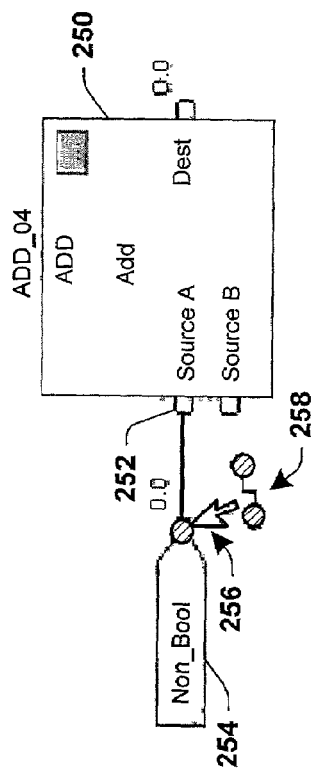
FIGS. 11 and 12 are schematic illustrations of smart wiring indications according to another aspect of the invention.
Figure 12:
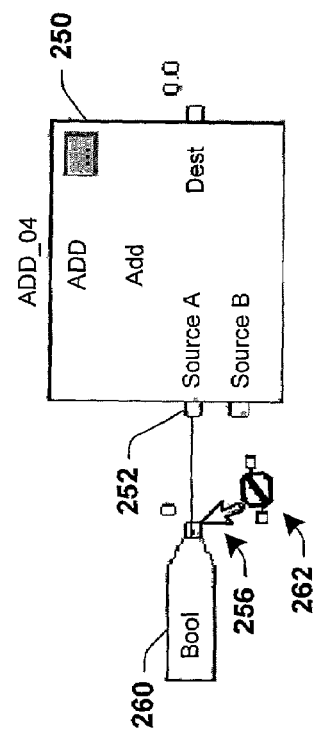

As illustrated in FIGS. 11 and 12, the interface may further provide wiring error indicia and a correct wiring indicia. For instance, a function block 250 may have a non-boolean input 252, which the user may wish to connect to a non-boolean type input reference 254. The user may wire the input 252 to the output of the input reference 254 using a cursor according to known wire creation or placement techniques. According to the invention, the user interface may provide a correct wiring indicia 258 proximate the cursor 256 to indicate that the user is attempting to make a proper wiring connection. Referring also to FIG. 12, where the user attempts to connect a boolean type input reference 260 to the non-boolean type input 250, the interface may provide a wiring error indicia 262 proximate the cursor 256, which provides an indication that the user is attempting to make an improper wiring connection to a function block in the function block diagram. The correct wiring indicia 258 and the wiring error indicia 262 may be useful, for example, where a user is making connections to a function block pin with the interface (e.g., display) image "zoomed" out because the pin types may not be distinguishable in the "zoomed" out view. In this case, the wiring error indicia 262 or the correct wiring indicia 258 may assist the user in connecting wires to appropriate pins in a function block diagram.

Figure 13:
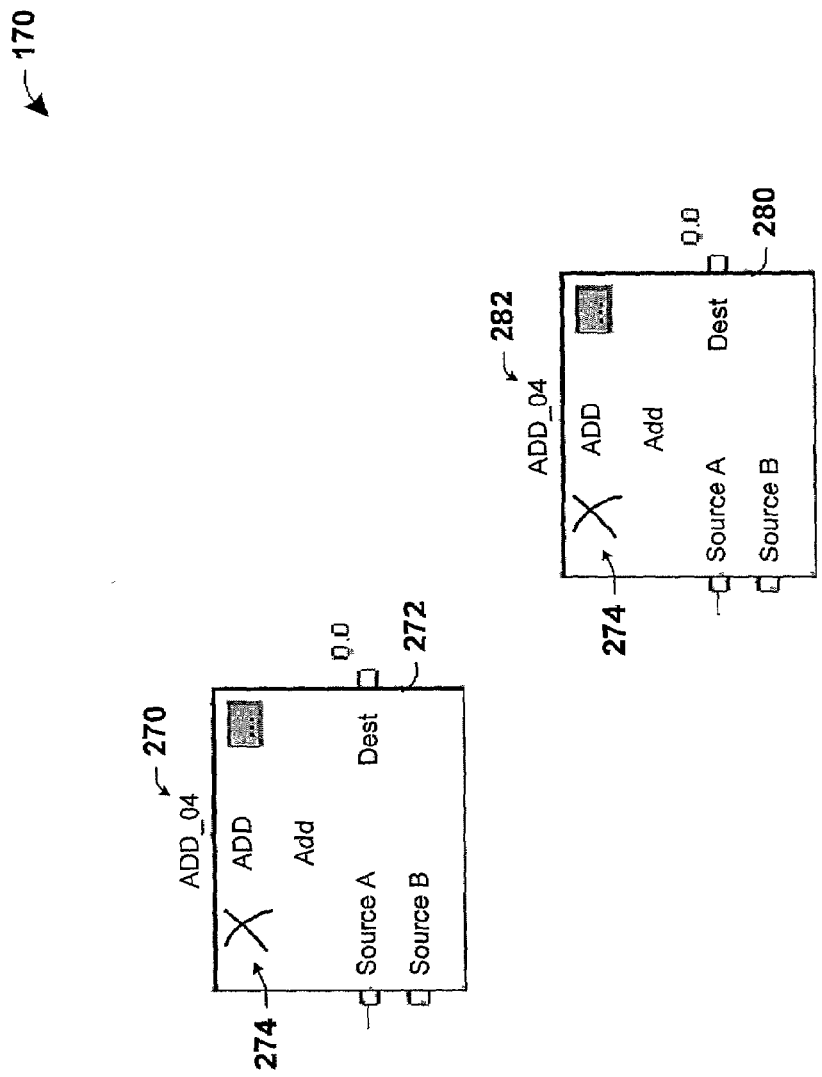
FIG. 13 is a schematic illustration of function block naming tags according to another aspect of the invention.

Referring to FIG. 13, the interface 170 may further provide a named backing structure of the correct data type for function blocks within a function block diagram. A block tag name indicia 270 may be associated with a function block 272 in the function block diagram, wherein a block tag name (e.g., "ADD_04") is associated with the block tag. The interface 170 may indicate the block tag name 270 proximate the function block 272 in the function block diagram. The name may be used to associate instance data with an instance 272 of the add type function block. The interface may create a block tag and a block tag name for each function block as the user adds function blocks to the function block diagram, wherein the block tag name created by the user interface for each function block is unique within the function block diagram.

The user may also manually rename a block tag name 282 for a function block 280 in the function block diagram, such as where a functional name is desired. In this case, the user interface 170 may determine whether the block tag name 282 created by the user is unique within the function block diagram, and if not, may provide an overlap error to the user. As illustrated in FIG. 13, the user may create block tag name 282 (e.g., "ADD_04"), which is non-unique (e.g., the same as tag name 270), and accordingly, the interface 170 will provide an error indication. For instance, one or both of the function blocks 272 and 280 having the name "ADD_04" may be indicated as in error via indicia 274 and 284, respectively.

The block tags 270 and 282 may further allow a user to copy the function blocks 272 or 280, in order to create a new function block (not shown). Where a user has a first function block having configuration information (e.g., block tag, pin visibility information, default parameter values, or the like) associated therewith, the user may copy the first function block to create a new function block in the function block diagram. The user interface is adapted to automatically copy the configuration information associated with the first function block, and to associate the copied configuration information with the new function block. The interface 170 may be further adapted to automatically copy configuration information associated with the copied function block (e.g., block 272 or 280), and to associate the copied configuration information with the new function block. In this regard, the configuration information may comprises the block tag (e.g., tags 270 or 282), pin visibility information, and a default parameter value (not shown). The user thus need not reconfigure each copy of a function block, in order to achieve similar configurations thereof.

In addition, the interface 170 may provide function block type morphing features, wherein a function block (e.g., block 272) may have a function block type associated therewith (e.g., add) in the function block diagram. The user interface 170 allows the user to change the function block type associated with the function block 272. The interface may also preserve wires connected to the function block when the user changes the function block type associated with the function block. Thus, the user may determine a subtraction is needed, rather than an addition, and simply change the add block 272 to a subtract block (not shown). In another example, the user may decide there is a logic error in the function block diagram (e.g., an AND function where an OR function is desired), and simply change the block type, without having to delete the AND block, and substitute an OR block.

As illustrated in FIGS. 14–17, the interface 170 may further provide intelligent deletion and restoration features, allowing a user to selectively delete and restore function block diagram elements in the function block diagram. As illustrated in FIGS. 14 and 15, the user may delete a function block 300 in the function block diagram, wherein the function block 300 was associated with input references 302 and 304 via wires 306 and 308, respectively. Rather than leaving the wires 306 and 308 after deletion of the function block 300 (e.g., as illustrated in FIG. 15), the interface 170 automatically deletes wires 306 and 308 as illustrated in FIG. 16, whereafter only the input references 302 and 304 remain in the interface 170. Thereafter, the user may decide to restore the deleted function block 300. If so, the interface 170 automatically restores the function block 300 as well as the deleted wires 306 and 308 associated with the restored function block 300 in the function block diagram.

Figure 18:
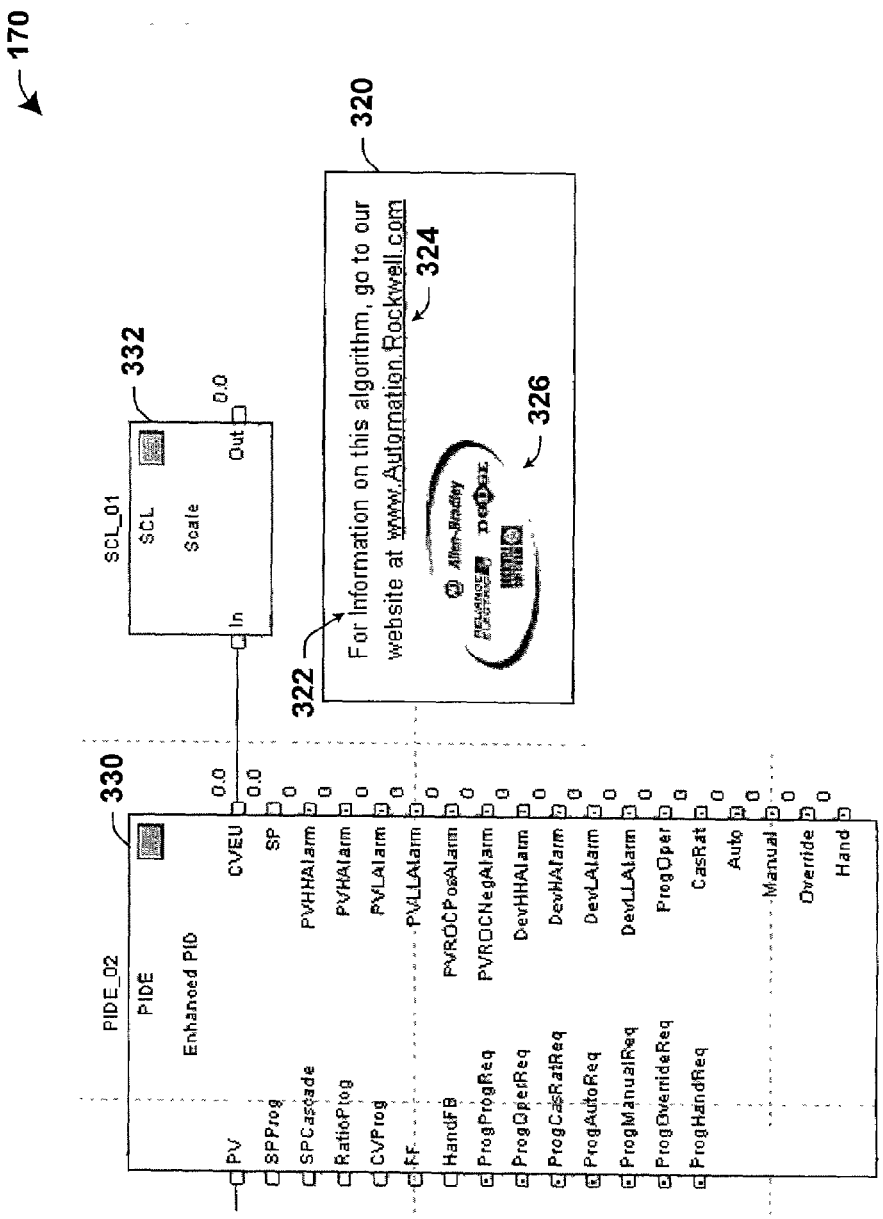
FIG. 18 is a schematic illustration of an exemplary free form text box according to another aspect of the invention.

Referring briefly to FIG. 18, another aspect of the invention provides a free-form text box 320 in the user interface 170, in which a user may embed text 322, links 324, graphics 326, or other information into a function block diagram. For example, the free-form text box 320 may comprise text (e.g., text 322), OLE objects, controls, faceplates, HTML tagged text, and/or links (e.g., link 324) in the function block diagram representation. The text box 320 may be located proximate one or more function block diagram elements, such as function blocks 330 and 332, according to user placement of the box 320.

Figure 19:
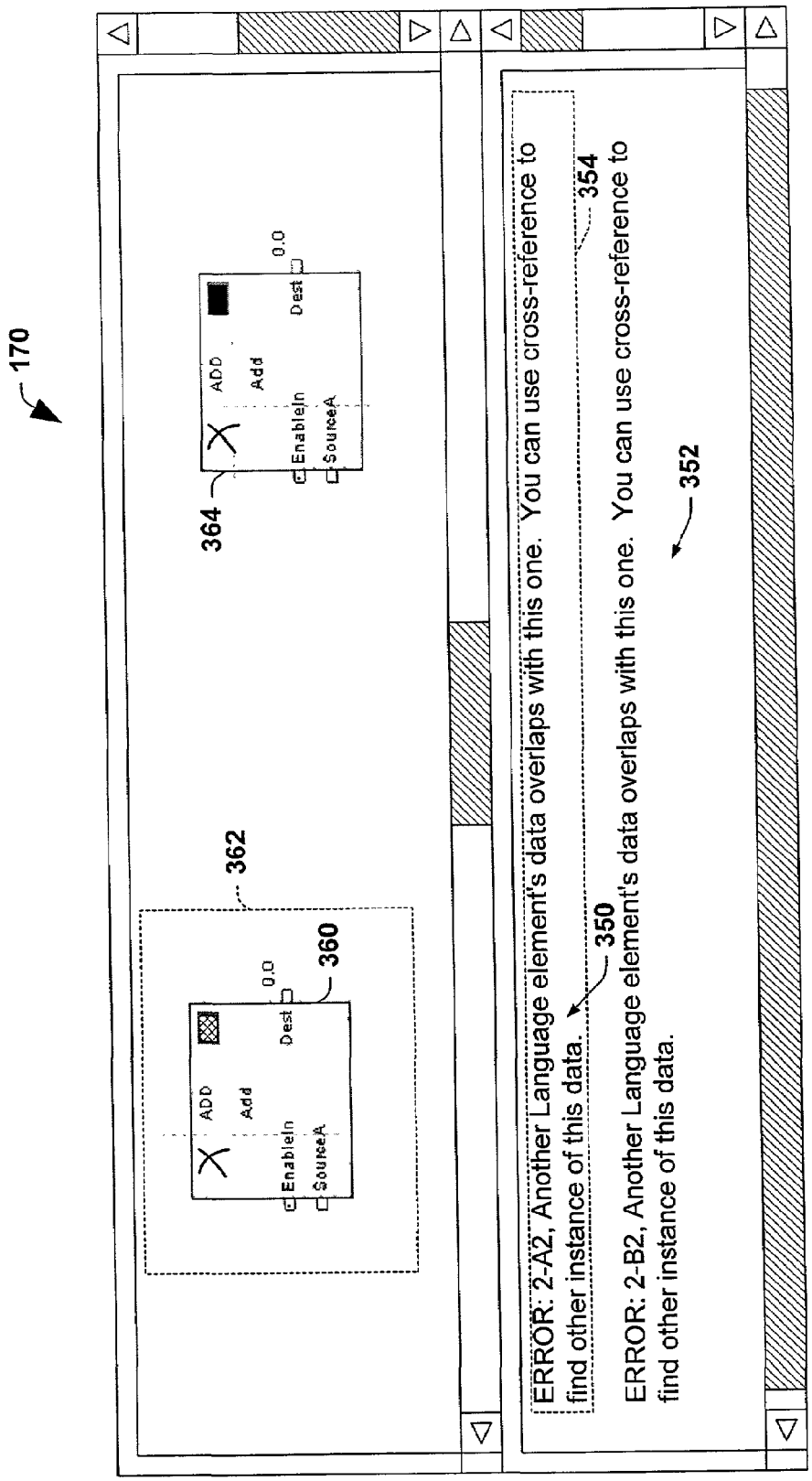
FIGS. 19 and 20 are schematic illustrations of an exemplary error navigation aspect of the invention.
Figure 20:
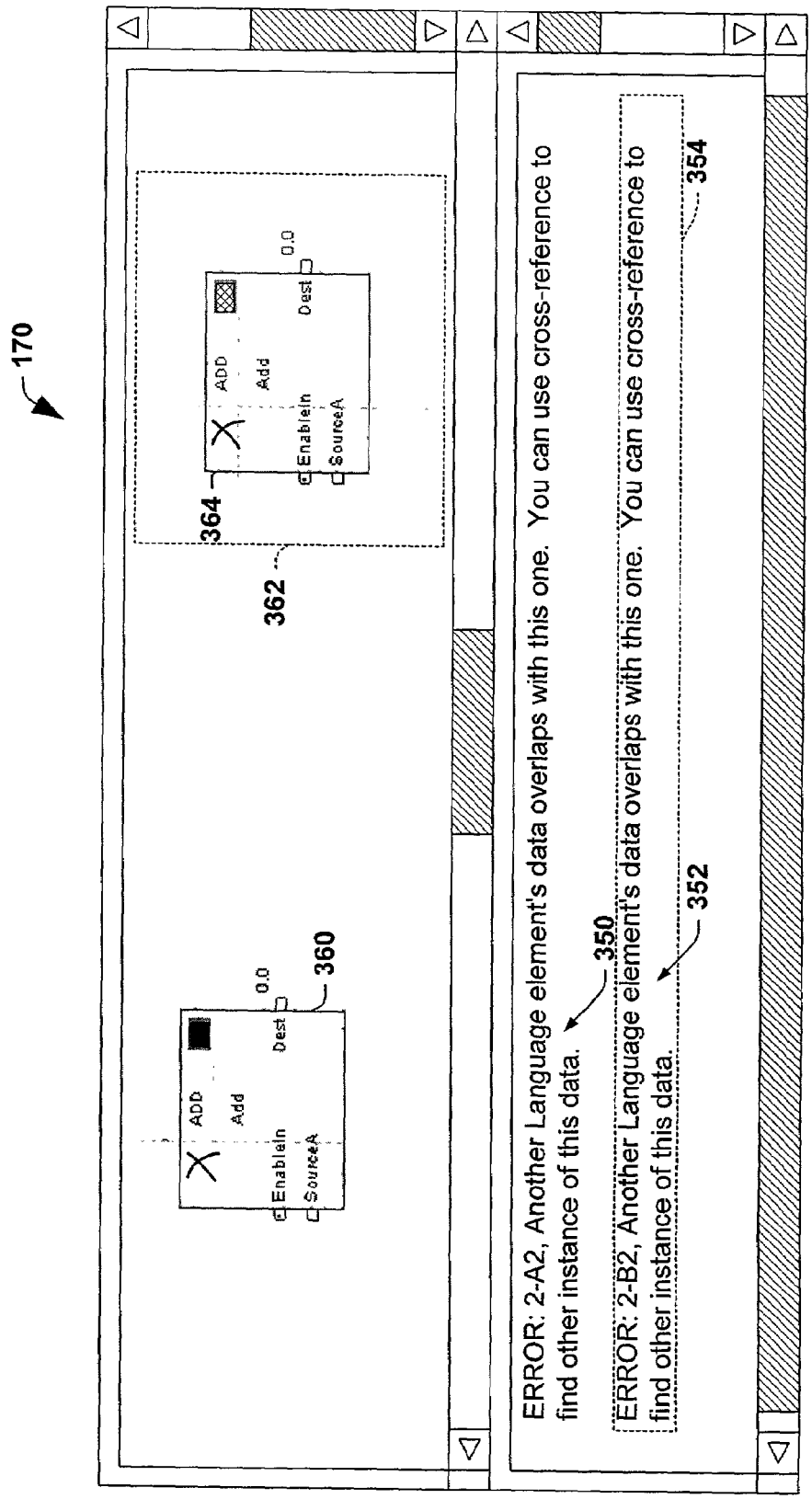

As illustrated in FIGS. 19 and 20, the exemplary user interface 170 may also provide one or more error message indicia 350 and 352, which indicate to a user that an error condition exists relative to the function block diagram. The user may select the error message indicia 350 (e.g., using a mouse, cursor, or other interface selection tool) as indicated by the dashed line 354. The interface 170 may automatically render a function block diagram element to the user, such as function block 360, which is associated with the selected error condition 350. The rendering of the suspected function block diagram element may comprise providing an indicia 362 around or proximate the function block 360 as illustrated in FIG. 19, or any other means for indicating a particular function block diagram element associated with an error condition.

In addition, where the function block diagram element associated with the selected error condition is not currently displayed to the user in the interface 170, the interface 170 may navigate to the function block diagram element of interest. For instance, the function block 360 may not be on the currently displayed sheet of the function block diagram. The interface 170 may accordingly navigate to the function block 360 associated with the selected error condition when the user selects the error message. Referring also to FIG. 20, if the user thereafter selects another error (e.g., error message indicia 352) in the interface 170, the interface 170 navigates to the function block diagram element (e.g., function block 364) associated therewith. This aspect of the invention provides the user with the ability to expeditiously navigate through the function block diagram to determine the cause of compiler or verification errors, without having to know the location of specific function block diagram elements.

Figure 21:
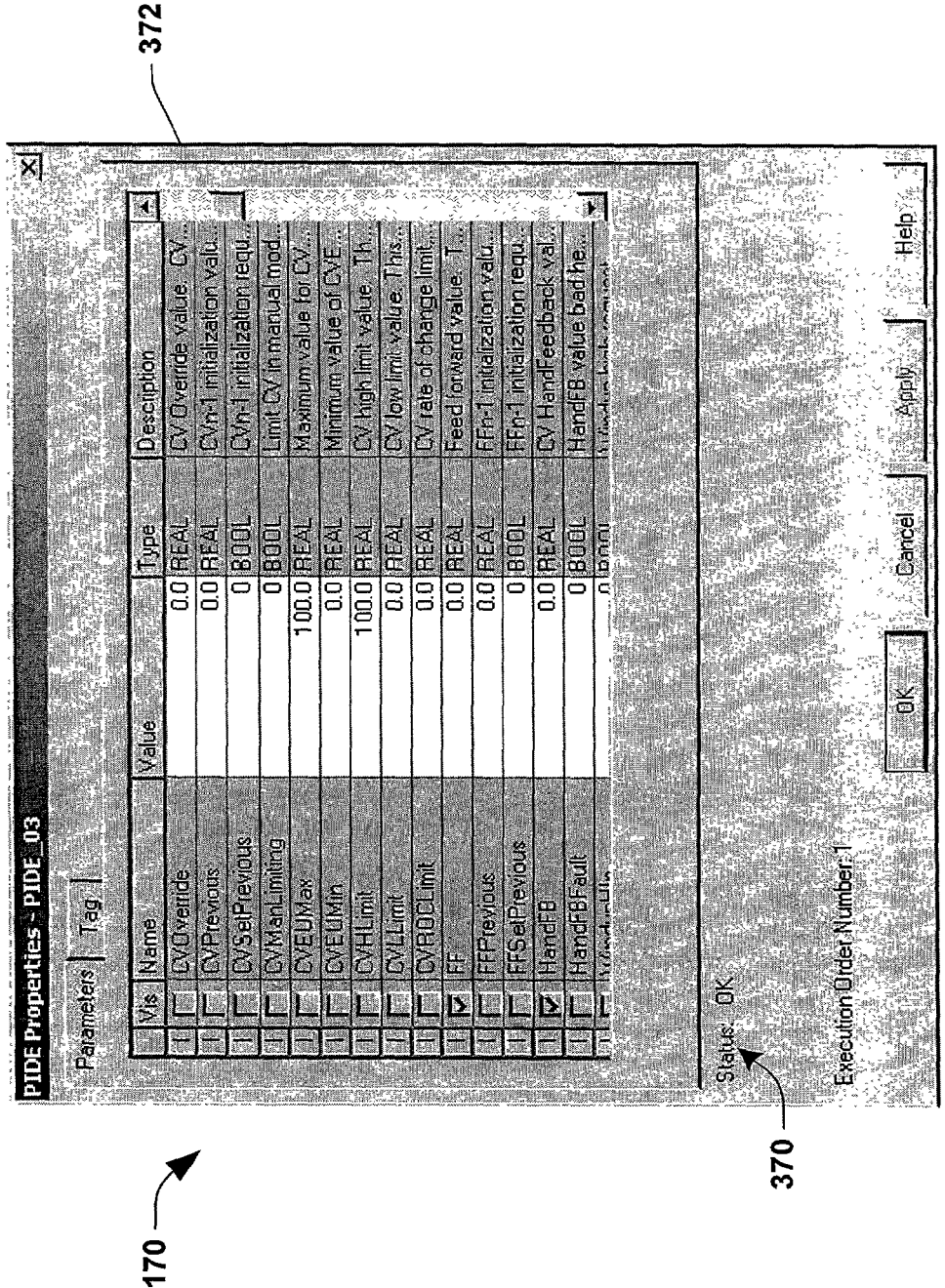
FIG. 21 is a schematic illustration of an exemplary block execution status information indicia according to another aspect of the invention.
Figure 22:
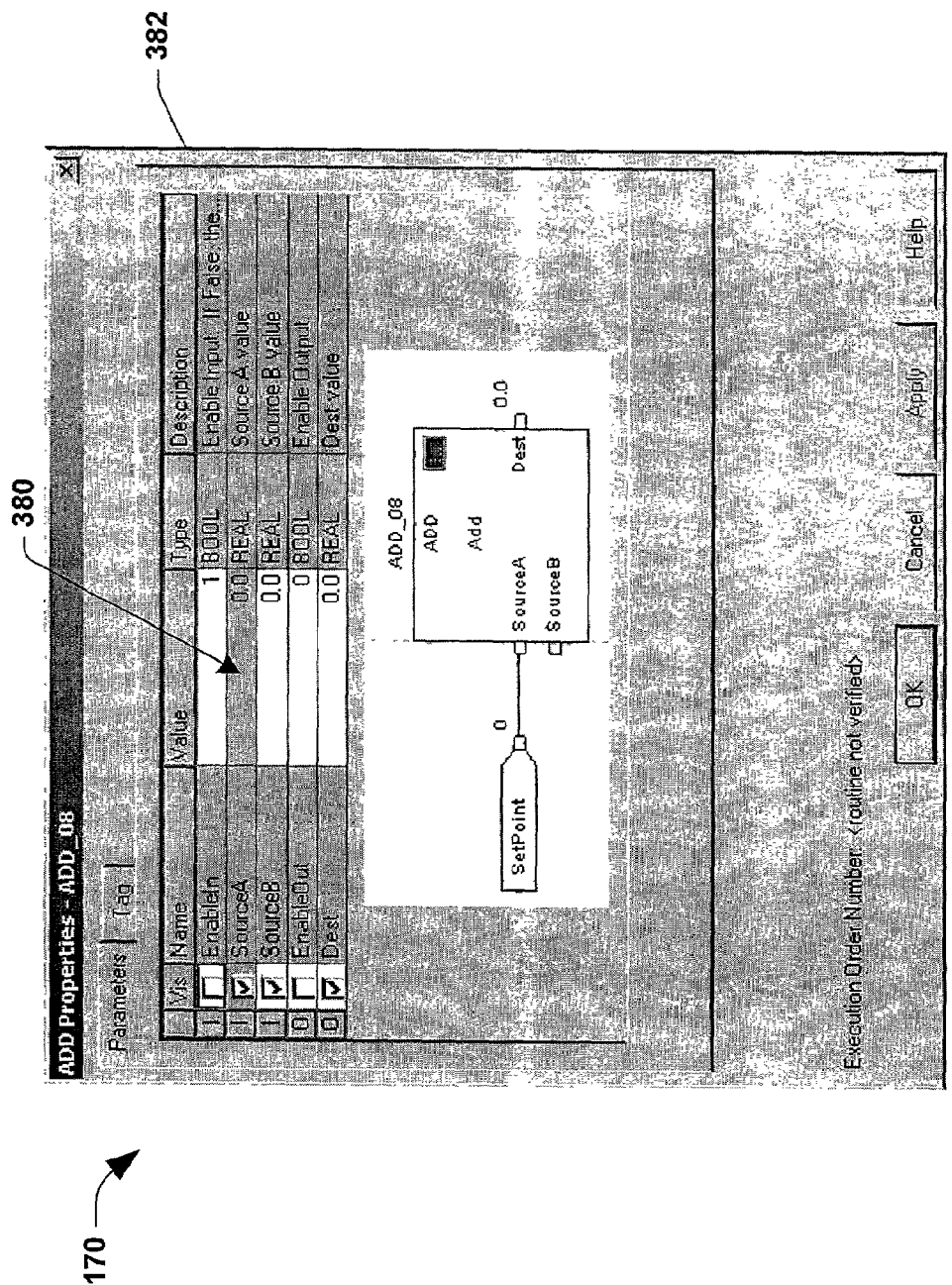
FIG. 22 is a schematic illustration of an exemplary wired data protection aspect of the invention.

Another aspect of the invention is illustrated in FIG. 21, in which the interface 170 provides a block execution status information indicia, such as a text indicia 370, which indicates the status of a function block (not shown) in the user interface 170. The block execution status information indicia 370, in this regard, may comprise the text indication 370 in a properties page 372 associated with the function block. Still another aspect of the invention is illustrated in FIG. 22. The interface 170 may allow the user to modify one or more parameters associated with a function block, including setting default values for certain parameters. However, where a particular parameter is associated with an input to the function block (e.g., a source input to an add block), which the user has wired to an input value source, the interface may prevent the user from setting a default value. In this regard, the interface 170 may further provide a wired block parameter indicia, such as by providing a grayed value field 380 in a parameter or properties page 382 associated with the function block. The wired block parameter indicia provides an indication to the user that the SourceA parameter associated with the block is wired to a value source in the function block diagram representation. This may advantageously indicate to the user that since the parameter is wired to a value source in the function block diagram, a default value for the parameter may not be set manually in the user interface.

Exemplary Control System

Figure 23:
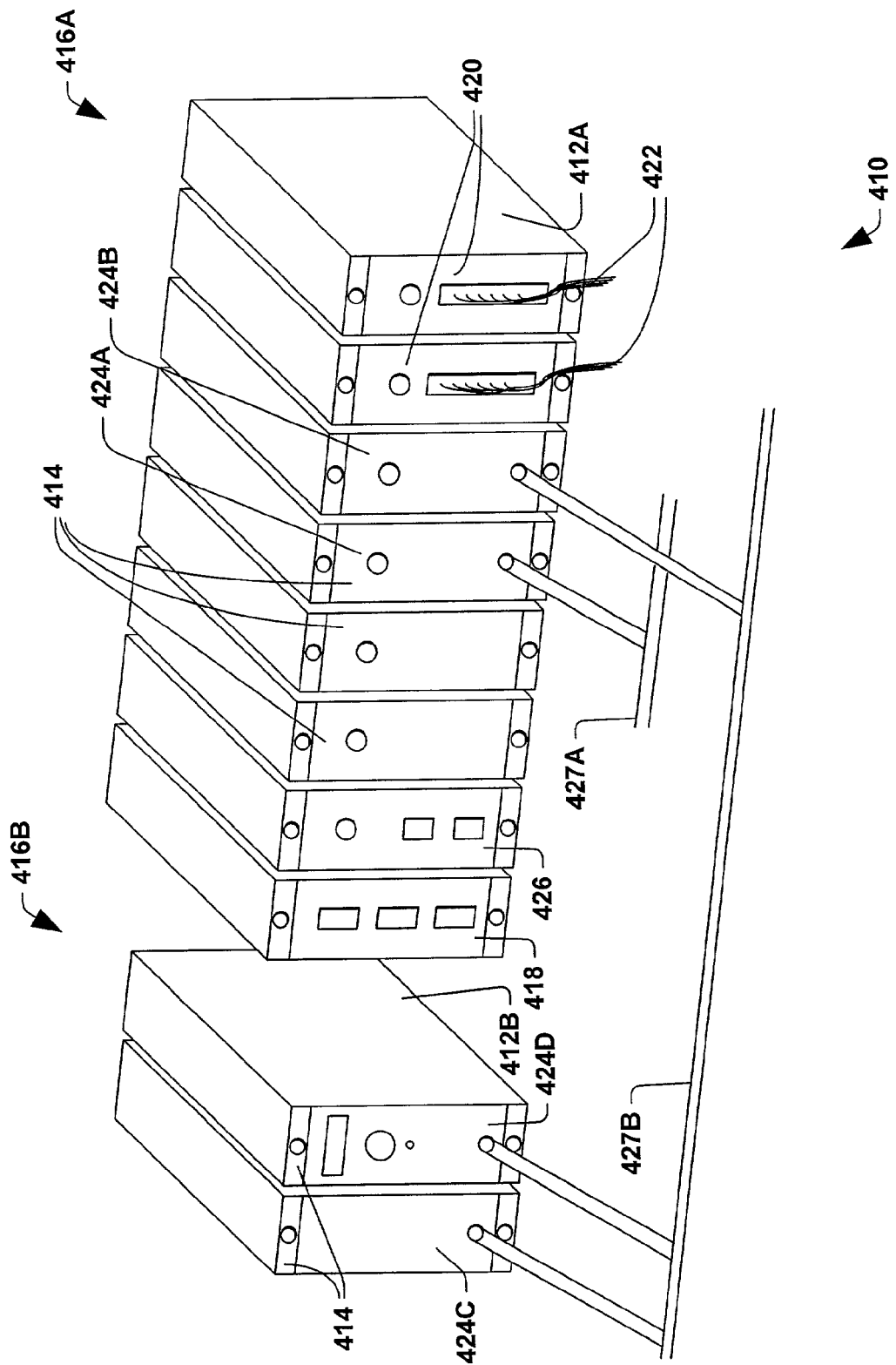
FIG. 23 is a perspective illustration of an exemplary industrial controller having multiple functional modules included within several chassis joined by communication links.

The various interface features and aspects of the invention may be employed in association with many forms of control systems and controller configuration systems. In order to provide context for the various applications in which the aspects of the invention may be carried out, an exemplary control system is now illustrated and described with respect to FIGS. 23 and 24. However, it will be appreciated that the various aspects of the invention may be employed in association with controllers and control systems other than those illustrated and described herein. A distributed industrial control system 410 suitable for use with the present invention provides a first and second chassis 412A and 412B for holding a number of functional modules 414 electrically interconnected by backplanes 416A and 416B running along the rear of the chassis 412A and 412B respectively. Each module 414 may be individually removed from the chassis 412A or 412B thereby disconnecting it from its respective backplane 416 for repair or replacement and to allow custom configuration of the distributed system 410.

The modules 414 within the chassis 412A may include, for example, a power supply module 418, a processor module 426, two communication modules 424A and 424B and two I/O modules 420. A power supply module 418 receives an external source of power (not shown) and provides regulated voltages to the other modules 414 by means of conductors on the backplane 416A. The I/O modules 420 provide an interface between inputs from, and outputs to external equipment (not shown) via cabling 422 attached to the I/O modules 420 at terminals on their front panels. The I/O modules 420 convert input signals on the cables 422 into digital words for transmission on the backplane 416A. The I/O modules 420 also convert other digital words from the backplane 416A to the necessary signal levels for control of equipment.

The communication modules 424A and 424B provide a similar interface between the backplane 416A and one of two external high speed communication networks 427A and 427B. The high speed communication networks 427A and 427B may connect with other modules 414 or with remote chassis of I/O modules 420, controller configuration tools or systems, or the like. In the example illustrated in FIG. 23, the high speed communication network 427A connects with backplane 416A via the communication module 424A, whereas the high speed communication network 427B connects the communication module 424B with communication modules 424C and 424D in chassis 412B. The processor module 426 processes information provided by the communication modules 424A and 424B and the I/O modules 420 according to a stored control program or routine, and provides output information to the communication module 424 and the I/O modules 420 in response to that stored program and received input messages.

Figure 24:
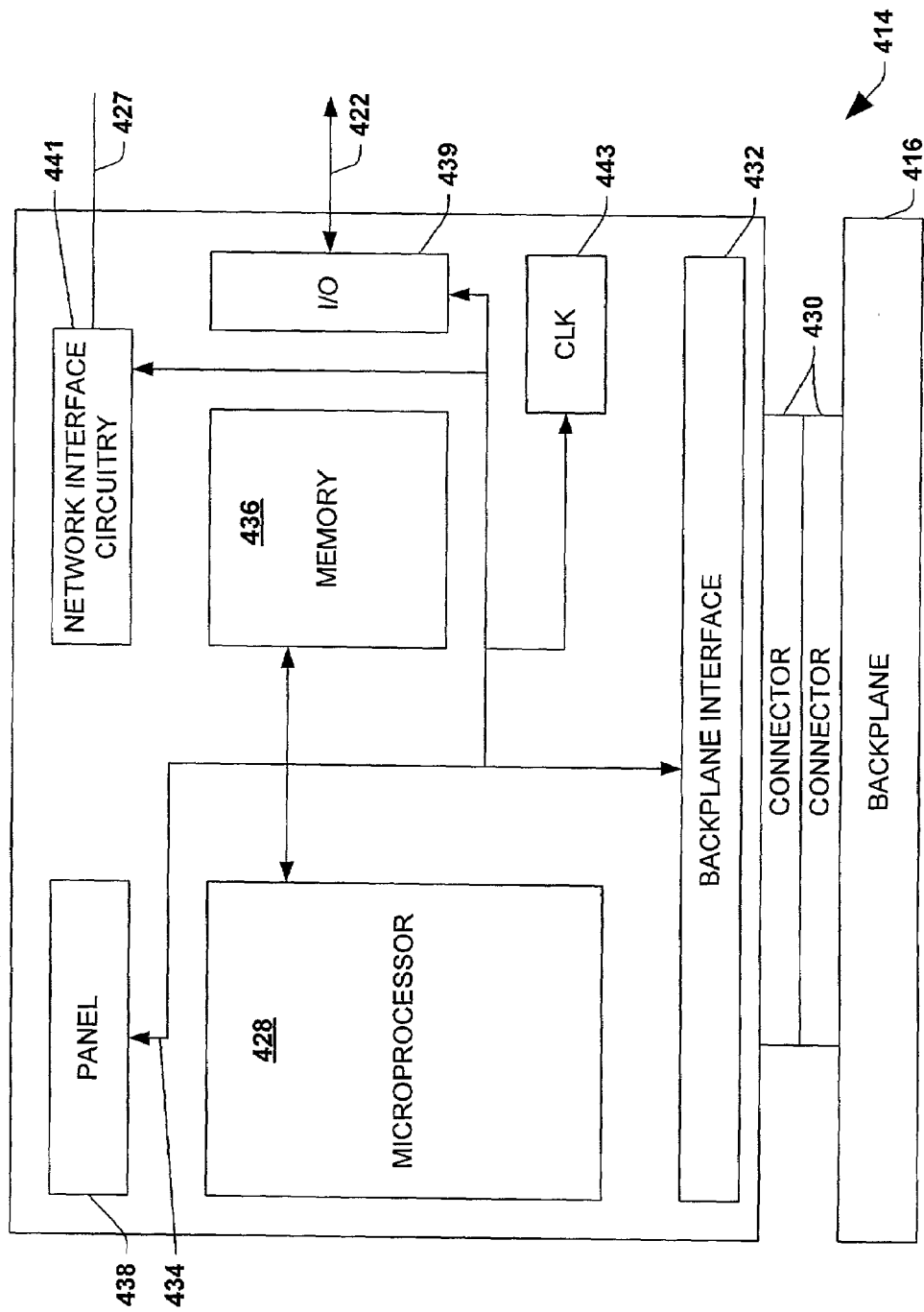
FIG. 24 is a schematic illustration of an exemplary single functional module of FIG. 6 illustrating its connection to a common backplane and communication links to communicate with other modules.

Referring also to FIG. 24, each functional module 414, is attached to the backplane 416 by means of a separable electrical connector 430 that permits the removal of the module 414 from the backplane 416 so that it may be replaced or repaired without disturbing the other modules 414. The backplane 416 provides the module 414 with both power and a communication channel to the other modules 414. Local communication with the other modules 414 through the backplane 416 is accomplished by means of a backplane interface 432, which electrically connects the backplane 416 through connector 430. The backplane interface 432 monitors messages on the backplane 416 to identify those messages intended for the particular module 414, based on a message address being part of the message and indicating the message destination. Messages received by the backplane interface 432 are conveyed to an internal bus 434 in the module 414.

The internal bus 434 joins the backplane interface 432 with a memory 436, a microprocessor 428, front panel circuitry 438, I/O interface circuitry 439 (if the module is an I/O module 420) and communication network interface circuitry 441 (if the module is a communication module 424). The microprocessor 428 may be a general purpose microprocessor providing for the sequential execution of instructions included within the memory 436 and the reading and writing of data to and from the memory 436 and the other devices associated with the internal bus 434. The microprocessor 428 includes an internal clock circuit (not shown) providing the timing of the microprocessor 428 but may also communicate with an external clock 443 of improved precision. This clock 443 may be a crystal controlled oscillator or other time standard including a radio link to an external time standard. The precision of the clock 443 may be recorded in the memory 436 as a quality factor. The panel circuitry 438 includes status indication lights such as are well known in the art and manually operable switches such as for locking the module 414 in the off state.

The memory 436 may comprise control programs or routines executed by the microprocessor 428 to provide control functions, as well as variables and data necessary for the execution of those programs or routines. For I/O modules 420, the memory 436 may also include an I/O table holding the current state of inputs and outputs received from and transmitted to the industrial controller 410 via the I/O modules 420. The module 414 may be adapted to perform the various methodologies of the invention, via hardware configuration techniques and/or by software programming techniques.

Exemplary Operating Environment

The interfaces and systems of the present invention may further be employed in association with many forms of computer systems. For example, the user interfaces and controller configuration systems may be implemented via hardware and software in a computer system. In order to provide context for the various applications in which the aspects of the invention may be carried out, an exemplary computer system is now illustrated and described with respect to FIG. 25. However, it will be appreciated that the various aspects of the invention may be employed in association with computers and computer systems other than those illustrated and described herein. Although the user interfaces, controller configuration systems, and other aspects of the invention have been described above in the general context of software tools and computer-executable instructions of a computer program that runs on a computer and/or computers, those skilled in the art will recognize that the invention also may be implemented in combination with other program modules.

Program modules in this regard may include routines, programs, components, data structures, etc. that perform particular tasks and/or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

Figure 25:
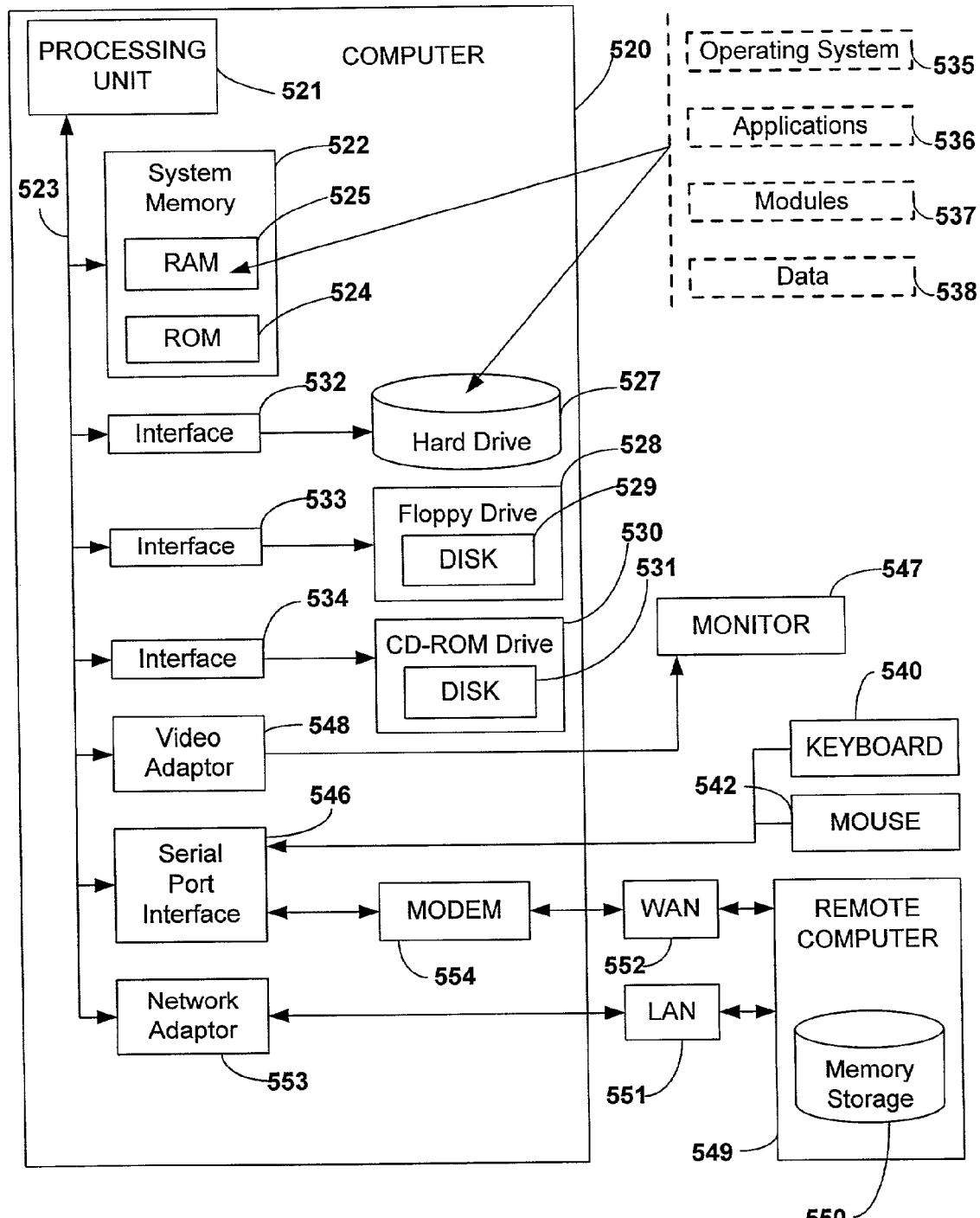
FIG. 25 is a schematic diagram illustrating an exemplary operating environment in which one or more aspects of the invention may be implemented.

With reference to FIG. 25, an exemplary environment for implementing various aspects of the invention includes a conventional personal or server computer 520, including a processing unit 521, a system memory 522, and a system bus 523 that couples various system components including the system memory to the processing unit 521. The processing unit 521 may be any of various commercially available processors. Dual microprocessors and other multi-processor architectures also can be used as the processing unit 521. The system bus 523 may be any of several types of bus structure including a memory bus or memory controller, a peripheral bus, and a local bus using any of a variety of conventional bus architectures. The computer memory may include read only memory (ROM) 524 and random access memory (RAM) 525. A basic input/output system (BIOS), containing the basic routines that help to transfer information between elements within the computer 520, such as during start-up, is stored in ROM 524.

The computer 520 further includes a hard disk drive 527, a magnetic disk drive 528, e.g., to read from or write to a removable disk 529, and an optical disk drive 530, e.g., for reading a CD-ROM disk 531 or to read from or write to other optical media. The hard disk drive 527, magnetic disk drive 528, and optical disk drive 530 are connected to the system bus 523 by a hard disk drive interface 532, a magnetic disk drive interface 533, and an optical drive interface 534, respectively. The drives and their associated computer-readable media provide nonvolatile storage of data, data structures, computer-executable instructions, etc. for the computer 520, including for the storage of broadcast programming in a suitable digital format.

Although the description of computer-readable media above refers to a hard disk, a removable magnetic disk and a CD-ROM, it will be appreciated by those skilled in the art that other types of media which are readable by a computer, such as zip drives, magnetic cassettes, flash memory cards, digital video disks, Bernoulli cartridges, and the like, may also be used in the exemplary operating environment, and further that any such media may contain computer-executable instructions for performing the methods of the present invention. A number of program modules may be stored in the drives and RAM 525, including an operating system 535, one or more application programs 536, other program modules 537, and program data 538.

A user may enter commands and information into the computer 520 through a keyboard 540 and a pointing device, such as a mouse 542. Other input devices (not shown) may include a microphone, an IR remote control, a joystick, a game pad, a satellite dish, a scanner, or the like. These and other input devices are often connected to the processing unit 521 through a serial port interface 546 that is coupled to the system bus 523, but may be connected by other interfaces, such as a parallel port, a game port, a universal serial bus ("USB"), an IR interface, etc. A monitor 547 or other type of display device is also connected to the system bus 523 via an interface, such as a video adapter 548. In addition to the monitor, a computer typically includes other peripheral output devices (not shown), such as speakers, printers etc.

The computer 520 may operate in a networked environment using logical connections to one or more remote computers, such as a remote computer(s) 549. The remote computer(s) 549 may be a workstation, a server computer, a router, a personal computer, microprocessor based entertainment appliance (e.g., a WebTV client system), a peer device or other common network node, and typically includes many or all of the elements described relative to the computer 520, although, for purposes of brevity, only a memory storage device 550 is illustrated. The logical connections depicted include a local area network (LAN) 551 and a wide area network (WAN) 552. Such networking environments are commonplace in offices, enterprise-wide computer networks, intranets and the Internet.

When used in a LAN networking environment, the computer 520 is connected to the local network 551 through a network interface or adapter 553. When used in a WAN networking environment, the computer 520 typically includes a modem 554, or is connected to a communications server on the LAN, or has other means for establishing communications over the WAN 552, such as the Internet. The modem 554, which may be internal or external, is connected to the system bus 523 via the serial port interface 546. In a networked environment, program modules depicted relative to the computer 520, or portions thereof, may be stored in the remote memory storage device 550. It will be appreciated that the network connections shown are exemplary and other means of establishing a communications link between the computers may be used.

Although the invention has been shown and described with respect to certain implementations, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (i.e., that is functionally equivalent), even though not structurally equivalent to the disclosed structure, which performs the function in the herein illustrated exemplary applications and implementations of the invention. As used in this application, the term "component" may refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, both an application running on a server and the server can be a component. In this regard, it will also be recognized that the invention includes a system as well as a computer-readable medium having computer-executable instructions for performing the steps of the various methods of the invention.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. In this regard, it will also be recognized that the invention includes a system as well as a computer-readable medium having computer-executable instructions for performing the steps of the various methods of the invention. In addition, while a particular feature of the invention may have been disclosed with respect to only one of several aspects or implementations of the invention, such a feature may be combined with one or more other features of the other implementations as may be desired and advantageous for any given or particular application. Furthermore, to the extent that the terms "includes", "including", "has", "having", and variants thereof are used in either the detailed description or the claims, these terms are intended to be inclusive in a manner similar to the term "comprising" and its variants.

What is claimed is:

1. A user interface for creation and editing of a function block diagram in a controller configuration system, comprising:
   a function block diagram representation; and
   one of a wire connector cross-reference indicia, a pin datatype indicia, and a block execution status information indicia;
   wherein the interface allows a user to modify the function block diagram representation in the controller configuration system;
   wherein the wire cross-reference indicia provides an indication proximate a wire connector in the function block diagram representation of a conviction associated with the wire connector and a hyperlink to the connection.

2. The user interface of claim 1, further comprising a feedback loop indicia wherein the feedback loop indicia comprises a localized feedback wire indicating the presence of a feedback loop in the function block diagram representation.

3. The user interface of claim 1, wherein the connector cross-reference indicia provides an indication proximate a wire connector in the function block diagram representation of a plurality of connections associated with the wire connector.

4. The user interface of claim 1, wherein the pin datatype indicia provides an indication of whether a datatype associated with a function block pin is one of boolean, non-boolean, or unknown in the function block diagram representation.

5. The user interface of claim 1, further comprising a wiring error indicia wherein the wiring error indicia provides an indication that a user is attempting to make an improper wiring connection to a function block in the function block diagram representation.

6. The user interface of claim 1, further comprising a correct wiring indicia that provides an indication that a user is attempting to make a proper wiring connection to a function block in the function block diagram representation.

7. The user interface of claim 1, further comprising a freeform text box wherein the free-form text box comprises one of text, an OLE object, a control, a faceplate, HTML tagged text, and a link in the function block diagram representation.

8. The user interface of claim 1, further comprising a configuration error indicia wherein the configuration error indicia comprises an indication proximate a function block diagram element in the fiction block diagram representation indicating that the function block diagram element cannot be verified as currently configured.

9. The user interface of claim 1, wherein the block execution status information indicia comprises an indication of a status condition associated with a function block in the function block diagram representation.

10. The user interface of claim 1, further comprising a wired block parameter indicia wherein the wired block parameter indicia comprises an indication in a properties page associated with a function block that a parameter associated with the block is wired to a value source in the function block diagram representation.

11. The user interface of claim 3, wherein the wire connector cross-reference indicia provides a plurality of hyperlinks to the plurality of connections associated with the wire connector in the function block diagram representation.

12. The user interface of claim 5, wherein the improper wiring connection comprises connection of a wire of a first data type to a pin of a second datatype, wherein the first and second datatypes are incompatible.

13. The user interface of claim 5, further comprising a correct wiring indicia wherein the correct wiring indicia provides an indication that a user is attempting to make a proper wiring connection to a function block in the function block diagram representation.

14. The user interface of claim 9, wherein the block execution status information indicia comprises an indication in a properties page associated with the function block.

15. The user interface of claim 10, wherein the indication in the properties page provides an indication to a user that a value for the parameter may not be set manually in the user interface.

16. A controller configuration system for creating and editing a function block diagram, comprising:
a user interface allowing a user to create and edit a function block diagram, the user interface comprising:
a function block diagram representation;
one of a wire connector cross-reference indicia, a pin datatype indicia, and a block execution status information indicia; and
a wired block parameter indicia that comprises an indication in a properties page associated with a function block that a parameter associated with the block is wired to a value source in the function block diagram representation, the indication provides that a value for the parameter may not be set manually in the user interface.

17. The controller configuration system of claim 16, further comprising a feedback loop indicia wherein the feedback loop indicia comprises a localized feedback wire indicating the presence of a feedback loop in the function block diagram representation.

18. The controller configuration system of claim 16, wherein the wire connector cross-reference indicia provides an indication proximate a wire connector in the function block diagram representation of a connection associated with the wire connector.

19. The controller configuration system of claim 16, wherein the pin datatype indicia provides an indication of whether a datatype associated with a function block pin is one of boolean, non-boolean, or unknown in the function block diagram representation.

20. The controller configuration system of claim 16, further comprising a wiring error indicia wherein the wiring error indicia provides an indication that a user is attempting to make an improper wiring connection to a function block in the function block diagram representation.

21. The controller configuration system of claim 16, wherein the correct wiring indicia provides an indication that a user is attempting to make a proper wiring connection to a function block in the function block diagram representation.

22. The controller configuration system of claim 16, further comprising a freeform text box wherein the free-form text box comprises one of text, an OLE object, a control, a faceplate, HTML tagged text, and a link in the function block diagram representation.

23. The controller configuration system of claim 16, further comprising a configuration error indicia wherein the configuration error indicia comprises an indication proximate a function block in the function block diagram representation indicating that the function block cannot be verified as currently configured.

24. The controller configuration system of claim 16, wherein the block execution status information indicia comprises an indication of a status condition associated with a function block in the function block diagram representation.

25. The controller configuration system of claim 18, wherein the wire connector cross-reference indicia provides a hyperlink to the connection associated with the wire connector in the function block diagram representation.

26. The controller configuration system of claim 18, wherein the connector cross-reference indicia provides an indication proximate a wire connector in the function block diagram representation of a plurality of connections associated with the wire connector.

27. The controller configuration system of claim 20, wherein the improper wiring connection comprises connection of a wire of a first data type to a pin of a second datatype, wherein the first and second datatypes are incompatible.

28. The controller configuration system of claim 20, further comprising a correct wiring indicia wherein the correct wiring indicia provides an indication that a user is attempting to make a proper wiring connection to a function block in the function block diagram representation.

29. The controller configuration system of claim 24, wherein the block execution status information indicia comprises an indication in a properties page associated with the function block.

30. The controller configuration system of claim 26, wherein the wire connector cross-reference indicia provides a plurality of hyperlinks to the plurality of connections associated with the wire connector in the function block diagram representation.

31. A user interface for creation and editing of a function block diagram in a controller configuration system, comprising:
- an input wire connector having an input wire name associated therewith;
- an output wire connector having an output wire name associated therewith; and
- a wire connector cross-reference indicia that provides an indication proximate at least one of the input wire connector and the output wire connector, and a hyperlink to a connection associated with the at least one of the input wire connector and the output wire connector;
- wherein the user interface is adapted to establish an association between a first function block diagram element connected to the input wire connector and a second function block diagram element connected to the output wire connector if the input wire name and the output wire name are the same.

32. The user interface of claim 31:
- wherein a user may create the input wire name associated with the input wire connector; and
- wherein the user interface is adapted to indicate to the user output wire names associated with output wire connectors available for association with the input wire connector;
- whereby the user may select an output wire name for use as the input wire name in order to associate the input wire connector with a desired output wire connector.

33. The user interface of claim 31:
- wherein a user may create the output wire name associated with the output wire connector; and
- wherein the user interface is adapted to indicate to the user input wire names associated with input wire connectors available for association with the output wire connector;
- whereby the user may select an input wire name for use as the output wire name in order to associate the output wire connector with a desired input wire connector.

34. The user interface of claim 33, wherein input wire names associated with input wire connectors already associated with another output wire connector are not indicated to the user, whereby the user is prevented from inadvertently associating an input with more than one output.

* * * * *